US012719534B2

(12) United States Patent
Sun et al.

(10) Patent No.: US 12,719,534 B2
(45) Date of Patent: Aug. 25, 2026

(54) UPLINK PRECODING METHOD AND APPARATUS

(71) Applicant: HUAWEI TECHNOLOGIES CO., LTD., Shenzhen (CN)

(72) Inventors: Yan Sun, Shanghai (CN); Xiaomeng Chai, Shanghai (CN); Yiqun Wu, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 85 days.

(21) Appl. No.: 18/758,984

(22) Filed: Jun. 28, 2024

(65) Prior Publication Data

US 2024/0356595 A1 Oct. 24, 2024

Related U.S. Application Data

(63) Continuation of application No. PCT/CN2022/144275, filed on Dec. 30, 2022.

(30) Foreign Application Priority Data

Dec. 31, 2021 (CN) ........................ 202111668221.2

(51) Int. Cl.

| | |
|---|---|
| ***H04B 7/0456*** | (2017.01) |
| ***H04W 72/044*** | (2023.01) |
| ***H04W 72/21*** | (2023.01) |

(52) U.S. Cl.
CPC ........ *H04B 7/0481* (2023.05); *H04W 72/046* (2013.01); *H04W 72/21* (2023.01)

(58) Field of Classification Search
CPC ... H04B 7/0481; H04W 72/21; H04W 72/046
See application file for complete search history.

(56) References Cited

U.S. PATENT DOCUMENTS

| | | | | |
|---|---|---|---|---|
| 10,911,195 | B2 * | 2/2021 | Park | H04W 16/28 |
| 11,916,832 | B2 * | 2/2024 | Go | H04W 52/06 |

(Continued)

FOREIGN PATENT DOCUMENTS

| | | | |
|---|---|---|---|
| CN | 109873665 | A | 6/2019 |
| EP | 3125437 | A1 | 2/2017 |

(Continued)

OTHER PUBLICATIONS

Zte et al., "Codebook based UL transmission," 3GPP TSG RAN WG1 Meeting #88, R1-1701792, Athens, Greece, Feb. 13-17, 2017, 3 pages.

(Continued)

*Primary Examiner* — Jaison Joseph
(74) *Attorney, Agent, or Firm* — Fish & Richardson P.C.

(57) ABSTRACT

Example uplink precoding methods and apparatuses are provided. One example method includes receiving a first reference signal from a terminal device. A first codebook is determined based on the received first reference signal, wherein the first codebook is used to precode an uplink signal. The first codebook is then sent to the terminal device.

(Continued)

In a second example, a first reference signal is sent to an access network device. A first codebook is then received from the access network device and an uplink signal is precoded using the first codebook.

15 Claims, 17 Drawing Sheets

(56) References Cited

U.S. PATENT DOCUMENTS

| | | | | |
|---|---|---|---|---|
| 2011/0216846 | A1* | 9/2011 | Lee | H04B 7/0473 375/295 |
| 2018/0287682 | A1* | 10/2018 | Kwak | H04B 7/0695 |
| 2020/0204406 | A1* | 6/2020 | Zhang | H04B 7/0456 |
| 2022/0416857 | A1* | 12/2022 | Fan | H04L 5/0051 |
| 2024/0048322 | A1* | 2/2024 | Ding | H04B 7/0604 |
| 2024/0322888 | A1* | 9/2024 | Chen | H04L 27/34 |
| 2024/0372600 | A1* | 11/2024 | Schreck | H04B 7/0456 |

FOREIGN PATENT DOCUMENTS

| | | | | |
|---|---|---|---|---|
| JP | 2009542052 | A | 11/2009 | |
| JP | 2010283633 | A | 12/2010 | |
| JP | 2017515344 | A | 6/2017 | |
| JP | 2020191622 | A | 11/2020 | |
| JP | 2021536155 | A | 12/2021 | |
| JP | 2022537979 | A | 8/2022 | |
| WO | 2010032810 | A1 | 3/2010 | |
| WO | 2021001202 | A1 | 1/2021 | |
| WO | 2021128289 | A1 | 7/2021 | |
| WO | WO-2021174553 | A1 * | 9/2021 | H04B 7/0456 |

OTHER PUBLICATIONS

International Search Report and Written Opinion in International Appln. No. PCT/CN2022/144275, mailed on Mar. 16, 2023, 15 pages (with English translation).

Office Action in Japanese Appln. No. 2024-539598, dated Jun. 26, 2025, 8 pages (with English translation).

Alrabeiah et al., "Neural Networks Based Beam Codebooks: Learning mmWave Massive MIMO Beams that Adapt to Deployment and Hardware," CoRR, Submitted on Jun. 25, 2020, arXiv:2006.14501v1, 30 pages.

Zhang et al., "Reinforcement Learning of Beam Codebooks in Millimeter Wave and Terahertz MIMO Systems," CoRR, Submitted on Feb. 22, 2021, arXiv:2102.11392v1, 30 pages.

Zhang et al., "Learning Beam Codebooks with Neural Networks: Towards Environment-Aware mmWave MIMO," Paper, Presented at Proceedings of 2020 IEEE 21st International Workshop on Signal Processing Advances in Wireless Communications (SPAWC), May 26, 2020, 5 pages.

Extended European Search Report in European Appln. No. 22915243.4, mailed on Mar. 18, 2025, 12 pages.

Office Action in Japanese Appln. No. 2024-539598, mailed on Nov. 25, 2025, 7 pages (with English translation).

Search Report in Japanese Appln. No. 2024-539598, mailed on Jun. 25, 2025, 31 pages (with English translation).

* cited by examiner

Codeword 5

Possible range of a code word 1 to 9

| Sub-band 1 | Sub-band 2 | Sub-band 3 | Sub-band 4 | Sub-band 5 |
|---|---|---|---|---|

Full band

FIG. 11

(a) CSI compression model (b) Precoding model

UPLINK PRECODING METHOD AND APPARATUS

CROSS-REFERENCE TO RELATED APPLICATIONS

This application is a continuation of International Application No. PCT/CN2022/144275, filed on Dec. 30, 2022, which claims priority to Chinese Patent Application No. 202111668221.2, filed on Dec. 31, 2021. The disclosures of the aforementioned applications are hereby incorporated by reference in their entireties.

TECHNICAL FIELD

Embodiments of this disclosure relate to the field of communication technologies, and in particular, to an uplink precoding method and an apparatus.

BACKGROUND

In a wireless communication network, for example, in a mobile communication network, services supported by the network are increasingly diversified, and therefore, requirements that need to be met are increasingly diversified. For example, the network needs to be able to support ultra-high rates, ultra-low latency, and/or ultra-large connections. This feature makes network planning, network configuration, and/or resource scheduling increasingly complex. In addition, because a network function is increasingly powerful, for example, supporting an increasingly high spectrum and supporting new technologies such as a high-order multiple-input multiple-output (MIMO) technology, beamforming, and/or beam management, network energy saving becomes a hot research topic. These new requirements, new scenarios, and new features bring unprecedented challenges to network planning, operation and maintenance, and efficient operation. To embrace this challenge, an artificial intelligence technology may be introduced into the wireless communication network, to implement network intelligence. Based on this, how to effectively implement artificial intelligence in a network is a problem worth studying.

SUMMARY

This disclosure provides an uplink precoding method and an apparatus, to implement precoding on an uplink signal.

According to a first aspect, an uplink precoding method is provided. The method is performed by a terminal device, or may be performed by a component (a processor, a chip, or another component) configured in a terminal device, or may be performed by a software module, or the like. The method includes: receiving first information from an access network device; precoding an uplink signal based on a first precoding matrix, where the first precoding matrix is determined based on an output of a first model, and an input of the first model is determined based on the first information; and sending a precoded uplink signal to the access network device.

According to the foregoing method, the terminal device determines the first precoding matrix based on the first information and the first model. The precoding matrix is no longer selected from an offline codebook, but may be a floating-point matrix generated by the terminal device based on the first information. The floating-point matrix is a complex matrix, so that the generated precoding matrix better matches a channel environment, thereby improving precoding effect.

In a design, the first information indicates a compressed first precoding matrix, and the output of the first model includes the first precoding matrix. Alternatively, the first information indicates compressed channel state information CSI, the output of the first model includes uplink channel information, and the first precoding matrix is determined based on the uplink channel information. Alternatively, the first information indicates compressed CSI, and the output of the first model includes the first precoding matrix.

In this disclosure, the compressed CSI may alternatively be referred to as CSI.

In a design, the first precoding matrix is at a wideband level, a sub-band level, or a resource element level.

According to the foregoing design, if the first precoding matrix generated by the terminal device is at the bandwidth level, uplink signals on an entire bandwidth are precoded by using a same precoding matrix. Alternatively, if the first precoding matrix is at the sub-band level, uplink signals are precoded by using precoding matrices corresponding to different sub-bands in the entire bandwidth. Similarly, if the first precoding matrix is at the resource element RE level, an uplink signal in each RE is precoded by using an uplink signal corresponding to the uplink signal in each RE. Compared with the precoding matrix at the bandwidth level, the precoding matrix at the sub-band level or the precoding matrix at the RE level can improve codebook and channel matching, and improve precoding precision.

According to a second aspect, an uplink precoding method is provided. The method is performed by an access network device, or may be performed by a component (a processor, a chip, or another component) configured in an access network device, or may be performed by a software module, or the like. The method includes: determining first information based on uplink channel information and a second model, where an input of the second model is determined based on the uplink channel information, and the first information is determined based on an output of the second model; and sending the first information to a terminal device, where the first information indicates a compressed first precoding matrix, or the first information indicates compressed channel state information CSI.

According to the foregoing design, the second model is deployed in the access network device, the access network device may determine the first information based on the uplink channel information of the terminal device and the second model, and the terminal device may restore a precoding matrix based on the first information and a first model. The precoding matrix restored by the terminal device based on the first information is a floating-point matrix instead of being selected from an offline matrix, and better matches a current channel environment of the terminal device, thereby improving precoding precision.

According to a third aspect, an uplink precoding method is provided. The method is performed by an access network device, or may be performed by a component (a processor, a chip, or another component) configured in an access network device, or may be performed by a software module, or the like. The method includes: receiving a first reference signal from a terminal device; determining a first codebook based on the received first reference signal, where the first codebook is used to precode an uplink signal; and sending the first codebook to the terminal device.

According to the foregoing method, the access network device may configure a corresponding personalized codebook, namely, the foregoing first codebook, for the terminal device based on a reference signal sent by the terminal device. Compared with a fixed codebook used by the terminal device, the personalized codebook can better match a channel characteristic of each terminal device, thereby improving precoding precision of the terminal device.

In a design, the determining a first codebook based on the received first reference signal includes: separately measuring the first reference signal on Z resources, to obtain Z pieces of uplink channel information, where Z is an integer greater than or equal to 1; and determining the first codebook based on the Z pieces of uplink channel information.

In a design, the determining the first codebook based on the Z pieces of uplink channel information includes: determining the first codebook based on the Z pieces of uplink channel information and a codebook generation model.

In a design, the determining the first codebook based on the Z pieces of uplink channel information includes: determining Z precoding matrices based on the Z pieces of uplink channel information; and determining the first codebook based on the Z precoding matrices.

In a design, the determining the first codebook based on the Z precoding matrices includes: determining M precoding matrices based on the Z precoding matrices and a precoding matrix generation model, where M is less than or equal to Z, and the first codebook includes the M precoding matrices.

In a design, the determining the first codebook based on the Z precoding matrices includes: determining M precoding matrices based on the Z precoding matrices and a precoding matrix generation model, where M is less than or equal to N; and separately quantizing the M precoding matrices to obtain M quantized precoding matrices, where the first codebook includes the M quantized precoding matrices.

According to the foregoing design, when configuring the personalized codebook for the terminal device, the access network device determines the Z precoding matrices based on the collected Z pieces of uplink channel information of the terminal device. Z coding matrices are converged into the M precoding matrices, where a value of M is less than or equal to a value of Z. The personalized codebook configured for the terminal device includes the M precoding matrices. In this design, the access network device needs to configure or indicate the personalized codebook to the terminal device. Therefore, when the foregoing design is used, overheads for indicating the personalized codebook by the terminal device may be reduced.

In a design, the method further includes: sending indication information to the terminal device, where the indication information indicates X precoding matrices corresponding to X sub-bands, the X precoding matrices belong to the first codebook, each of the X precoding matrices is used to precode an uplink signal on a corresponding sub-band, and X is a positive integer.

According to the foregoing design, after configuring the personalized codebook for the terminal device, the access network device may further send the indication information to the terminal device, where the indication information indicates a precoding matrix corresponding to each sub-band in an uplink bandwidth of the terminal device. Compared with a method in which a same precoding matrix is used in an entire uplink bandwidth, this method enables the precoding matrix to match a channel characteristic corresponding to each sub-band, thereby improving precoding precision.

In a design, the sending indication information to the terminal device includes: sending the indication information to the terminal device according to an indication rule of a sub-band precoding matrix.

In a design, the method further includes: sending the indication rule of the sub-band precoding matrix to the terminal device.

In a design, the indication rule of the sub-band precoding matrix includes: An uplink channel bandwidth includes at least a first sub-band and a second sub-band, where an indication rule of a precoding matrix corresponding to the first sub-band includes: indicating an index of the precoding matrix corresponding to the first sub-band; and an indication rule of a precoding matrix corresponding to the second sub-band includes: indicating an offset direction and an offset value that are of an index of the precoding matrix of the second sub-band relative to the index of the precoding matrix of the first sub-band.

According to the foregoing design, if the access network device separately indicates the index of the precoding matrix corresponding to each sub-band, indication overheads are high. In this design, the access network device formulates an indication rule in advance, and notifies the terminal device of the indication rule. Subsequently, the access network device indicates indexes of corresponding precoding matrices for some sub-bands in the entire bandwidth. Another sub-band may serve as an adjacent band of the some sub-bands. The access network device indicates an offset direction, an offset value, and the like of an index of a precoding matrix of the adjacent band relative to an index of a precoding matrix corresponding to a previous sub-band. This reduces overheads for indicating a precoding matrix.

In a design, the first codebook is a codebook of the first sub-band, and the first codebook is used to precode an uplink signal on the first sub-band.

According to the foregoing design, a base station may configure, for the terminal device, a codebook applicable to the entire uplink bandwidth, namely, the first codebook. Subsequently, the base station may need to indicate, to the terminal device, an index of a precoding matrix corresponding to each sub-band in the first codebook. Alternatively, the base station may directly configure, for the terminal, a codebook applicable to each sub-band, for example, the first codebook applicable to the first sub-band. Subsequently, the base station indicates, in a codebook corresponding to each sub-band, an index of a precoding matrix corresponding to each sub-band, and the like. This manner of configuring a codebook corresponding to each sub-band may improve precision of a codebook configured for a terminal.

According to a fourth aspect, an uplink precoding method is provided. The method corresponds to the terminal device in the third aspect. For beneficial effect, refer to the third aspect. The method is performed by a terminal device, or may be performed by a component (a processor, a chip, or another component) configured in a terminal device, or may be performed by a software module, or the like. The method includes: sending a first reference signal to an access network device; receiving a first codebook from the access network device; and precoding an uplink signal by using the first codebook.

In a design, the precoding an uplink signal by using the first codebook includes: receiving indication information from the access network device, where the indication information indicates X precoding matrices corresponding to X sub-bands, and the X precoding matrices belong to the first codebook; and precoding an uplink signal on a corresponding sub-band by using each of the X precoding matrices.

In a design, the method further includes: receiving, from the access network device, an indication rule of a sub-band precoding matrix.

In a design, the indication rule of the sub-band precoding matrix includes: An uplink channel bandwidth includes at least a first sub-band and a second sub-band, where an indication rule of a precoding matrix corresponding to the first sub-band includes: indicating an index of the precoding matrix corresponding to the first sub-band; and an indication rule of a precoding matrix corresponding to the second sub-band includes: indicating an offset direction and an offset value that are of an index of the precoding matrix of the second sub-band relative to the index of the precoding matrix of the first sub-band.

In a design, the first codebook is a codebook of the first sub-band, and the precoding an uplink signal by using the first codebook includes: precoding an uplink signal of the first sub-band by using the first codebook.

According to a fifth aspect, an apparatus is provided. For beneficial effect, refer to the descriptions of the first aspect or the fourth aspect. The apparatus may be a terminal device, or an apparatus configured in a terminal device, or an apparatus that can be used in match with a terminal device. In a design, the apparatus may include units that are in a one-to-one correspondence with the methods/operations/steps/actions described in the first aspect or the fourth aspect. The units may be implemented by using a hardware circuit, software, or a combination of a hardware circuit and software.

For example, the apparatus may include a processing unit and a communication unit, and the processing unit and the communication unit may perform corresponding functions in any design example of the first aspect. Specifically, it is as follows.

The communication unit is configured to receive first information from an access network device. The processing unit is configured to precode an uplink signal based on a first precoding matrix, where the first precoding matrix is determined based on an output of a first model, and an input of the first model is determined based on the first information. The communication unit is further configured to send a precoded uplink signal to the access network device.

For specific execution processes of the processing unit and the communication unit, refer to the descriptions of the first aspect.

For example, the apparatus includes a processor, configured to implement the method described in the first aspect. The apparatus may further include a memory, configured to store instructions and/or data. The memory is coupled to the processor. When the processor executes the program instructions stored in the memory, the method in the first aspect can be implemented. The apparatus may further include a communication interface, and the communication interface is used by the apparatus to communicate with another device. For example, the communication interface may be a transceiver, a circuit, a bus, a module, a pin, or another type of communication interface, and the another device may be an access network device or the like.

In a possible design, the apparatus is configured to implement the method described in the first aspect. The apparatus includes:

a memory, configured to store program instructions;

a communication interface, configured to: receive first information from an access network device, and send a precoded uplink signal to the access network device; and a processor, configured to precode an uplink signal based on a first precoding matrix, where the first precoding matrix is determined based on an output of a first model, and an input of the first model is determined based on the first information.

For specific execution processes of the communication interface and the processor, refer to the descriptions of the first aspect. Details are not described again.

For example, the apparatus may include a processing unit and a communication unit, and the processing unit and the communication unit may perform corresponding functions in any design example of the fourth aspect. Specifically, it is as follows.

The communication unit is configured to: send a first reference signal to an access network device, and receive a first codebook from the access network device. The processing unit is configured to precode an uplink signal by using the first codebook.

For specific execution processes of the processing unit and the communication unit, refer to the descriptions of the fourth aspect.

For example, the apparatus includes a processor, configured to implement the method described in the fourth aspect. The apparatus may further include a memory, configured to store instructions and/or data. The memory is coupled to the processor. When the processor executes the program instructions stored in the memory, the method in the fourth aspect can be implement. The apparatus may further include a communication interface, and the communication interface is used by the apparatus to communicate with another device. For example, the communication interface may be a transceiver, a circuit, a bus, a module, a pin, or another type of communication interface, and the another device may be an access network device or the like.

In a possible design, the apparatus is configured to implement the method described in the fourth aspect. The apparatus includes:

a memory, configured to store program instructions;

a communication unit, configured to: send a first reference signal to an access network device, and receive a first codebook from the access network device; and a processor, configured to precode an uplink signal by using the first codebook.

For specific execution processes of the communication interface and the processor, refer to the descriptions of the fourth aspect. Details are not described again.

According to a sixth aspect, an apparatus is provided. For beneficial effect, refer to the descriptions of the second aspect or the third aspect. The apparatus may be an access network device, or an apparatus configured in an access network device, or an apparatus that can be used in match with an access network device. In a design, the apparatus may include units that are in a one-to-one correspondence with the methods/operations/steps/actions described in the second aspect or the third aspect. The units may be implemented by using a hardware circuit, software, or a combination of a hardware circuit and software.

For example, the apparatus may include a processing unit and a communication unit, and the processing unit and the communication unit may perform corresponding functions in any design example of the second aspect. Specifically, it is as follows.

The processing unit is configured to determine first information based on uplink channel information and a second model, where an input of the second model is determined based on the uplink channel information, and the first information is determined based on an output of the second model.

The communication unit is configured to send the first information to a terminal device, where the first information indicates a compressed first precoding matrix, or the first information indicates compressed channel state information CSI.

For specific execution processes of the processing unit and the communication unit, refer to the descriptions of the second aspect. Details are not described herein again.

For example, the apparatus includes a processor, configured to implement the method described in the second aspect. The apparatus may further include a memory, configured to store instructions and/or data. The memory is coupled to the processor. When the processor executes the program instructions stored in the memory, the method described in the second aspect can be implemented. The apparatus may further include a communication interface, and the communication interface is used by the apparatus to communicate with another device. For example, the communication interface may be a transceiver, a circuit, a bus, a module, a pin, or another type of communication interface, and the another device may be a terminal or the like. In a possible design, the apparatus includes:

- a memory, configured to store program instructions;
- a processor, configured to determine first information based on uplink channel information and a second model, where an input of the second model is determined based on the uplink channel information, and the first information is determined based on an output of the second model; and
- a communication interface, configured to send the first information to a terminal device, where the first information indicates a compressed first precoding matrix, or the first information indicates compressed channel state information CSI.

For specific execution processes of the communication interface and the processor, refer to the descriptions of the second aspect. Details are not described again.

For example, the apparatus may include a processing unit and a communication unit, and the processing unit and the communication unit may perform corresponding functions in any design example of the third aspect. Specifically, it is as follows.

The communication unit is configured to receive a first reference signal from a terminal device.

The processing unit is configured to determine a first codebook based on the received first reference signal, where the first codebook is used to precode an uplink signal.

The communication unit is configured to send the first codebook to the terminal device.

For specific execution processes of the communication unit and the processing unit, refer to the descriptions of the third aspect. Details are not described again.

For example, the apparatus includes a processor, configured to implement the method described in the third aspect. The apparatus may further include a memory, configured to store instructions and/or data. The memory is coupled to the processor. When the processor executes the program instructions stored in the memory, the method described in the third aspect can be implemented. The apparatus may further include a communication interface, and the communication interface is used by the apparatus to communicate with another device. For example, the communication interface may be a transceiver, a circuit, a bus, a module, a pin, or another type of communication interface, and the another device may be a terminal or the like. In a possible design, the apparatus includes:

- a memory, configured to store program instructions;
- a communication interface, configured to: receive a first reference signal from a terminal device, and send a first codebook to the terminal device; and
- a processor, configured to determine the first codebook based on the received first reference signal, where the first codebook is used to precode an uplink signal.

For specific execution processes of the communication interface and the processor, refer to the descriptions of the third aspect. Details are not described again.

According to a seventh aspect, this disclosure further provides a computer-readable storage medium, including instructions. When the instructions are run on a computer, the computer is enabled to perform the method in any one of the first aspect to the fourth aspect.

According to an eighth aspect, this disclosure further provides a chip system. The chip system includes a processor, may further include a memory, and is configured to implement the method in any one of the first aspect to the fourth aspect. The chip system may include a chip, or may include a chip and another discrete component.

According to a ninth aspect, this disclosure further provides a computer program product, including instructions. When the instructions are run on a computer, the computer is enabled to perform the method in any one of the first aspect to the fourth aspect.

According to a tenth aspect, this disclosure further provides a system. The system includes the apparatus in the fifth aspect and the apparatus in the sixth aspect.

BRIEF DESCRIPTION OF DRAWINGS

FIG. 11 is a diagram of a sub-band according to this disclosure;

DESCRIPTION OF EMBODIMENTS

Figure 1:
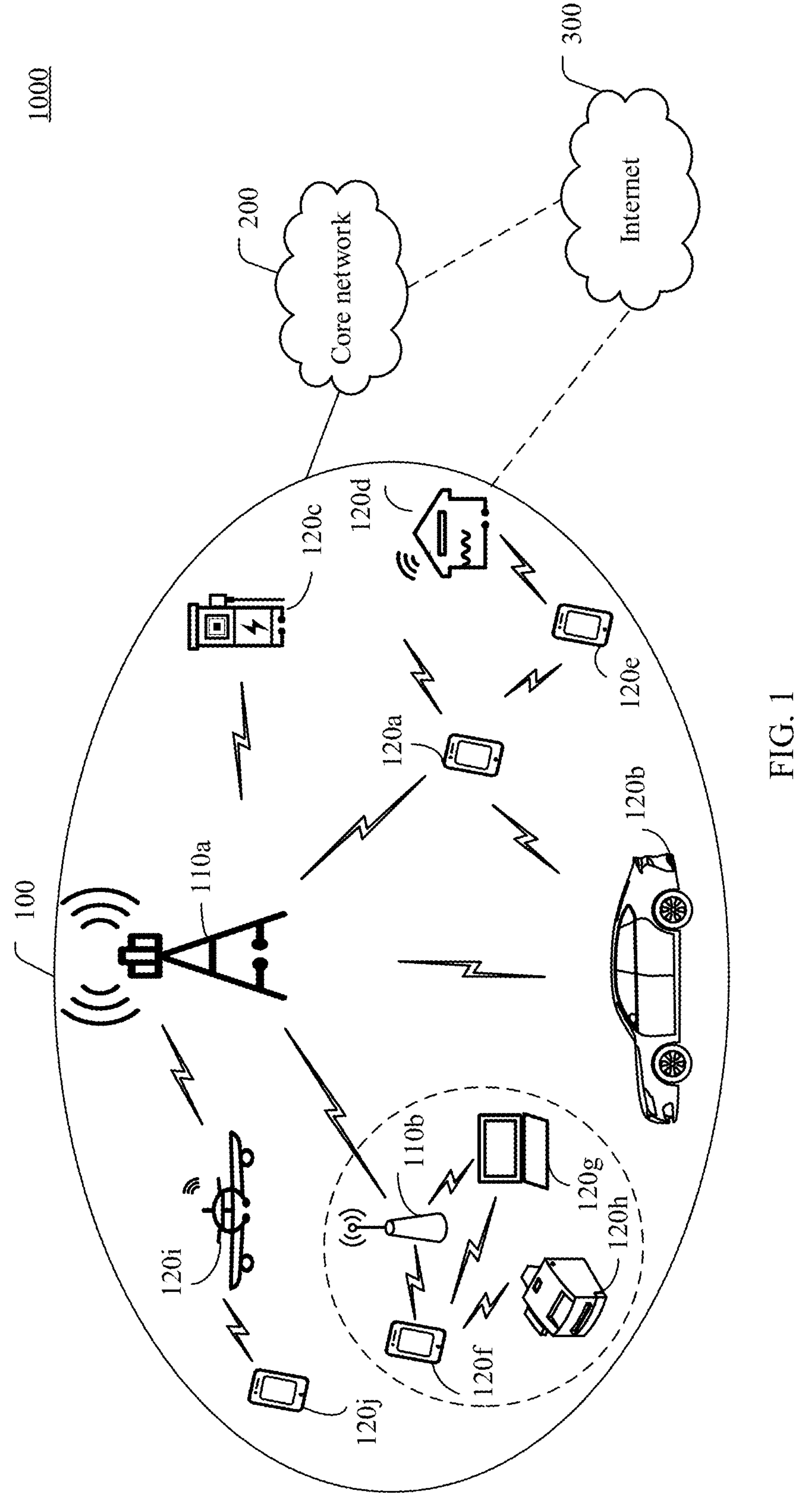
FIG. 1 is a diagram of a communication system according to this disclosure.

FIG. 1 is a diagram of an architecture of a communication system 1000 to which this disclosure can be applied. As shown in FIG. 1, the communication system includes a radio access network 100 and a core network 200. Optionally, the communication system 1000 may further include an internet 300. The radio access network 100 may include at least one access network device (for example, 110*a* and 110*b* in FIG. 1), and may further include at least one terminal device (for example, 120*a* to 120*j* in FIG. 1). The terminal device is connected to the access network device in a wireless manner, and the access network device is connected to the core network in a wireless or wired manner. The core network device and the access network device may be different physical devices that are independent of each other, or functions of the core network device and logical functions of the access network device may be integrated into a same physical device, or some functions of the core network device and some functions of the access network device may be integrated into one physical device. Terminal devices may be connected to each other in a wired or wireless manner, and access network devices may be connected to each other in a wired or wireless manner. FIG. 1 is only a diagram. The communication system may further include another network device, for example, may further include a wireless relay device and a wireless backhaul device, which are not shown in FIG. 1.

The access network device may be a base station, an evolved NodeB (eNodeB), a transmission reception point (TRP), a next generation NodeB (gNB) in a 5th generation (5G) mobile communication system, an access network device in an open radio access network (O-RAN), a next generation base station in a 6th generation (6G) mobile communication system, a base station in a future mobile communication system, an access node in a wireless fidelity (Wi-Fi) system, or the like. Alternatively, the access network device may be a module or unit that completes some functions of a base station, for example, may be a central unit (CU), a distributed unit (DU), a central unit control plane (CU-CP) module, or a central unit user plane (CU-UP) module. The access network device may be a macro base station (for example, 110*a* in FIG. 1), or may be a micro base station or an indoor base station (for example, 110*b* in FIG. 1), or may be a relay node, a donor node, or the like. A specific technology and a specific device form used by the access network device are not limited in this disclosure.

In this disclosure, an apparatus configured to implement a function of the access network device may be an access network device, or may be an apparatus that can support the access network device in implementing the function, for example, a chip system, a hardware circuit, a software module, or a combination of a hardware circuit and a software module. The apparatus may be installed in the access network device or may be matched with the access network device for usage. In this disclosure, the chip system may include a chip, or may include a chip and another discrete component. For ease of description, the following describes the technical solutions provided in this disclosure by using an example in which the apparatus configured to implement the function of the access network device is an access network device and the access network device is a base station.

(1) Protocol Layer Structure

Communication between an access network device and a terminal device complies with a specified protocol layer structure. The protocol layer structure may include a control plane protocol layer structure and a user plane protocol layer structure. For example, the control plane protocol layer structure may include functions of protocol layers such as a radio resource control (RRC) layer, a packet data convergence protocol (PDCP) layer, a radio link control (RLC) layer, a media access control (MAC) layer, and a physical layer. For example, the user plane protocol layer structure may include functions of protocol layers such as a PDCP layer, an RLC layer, a MAC layer, and a physical layer. In a possible implementation, a service data adaptation protocol (SDAP) layer may be further included above the PDCP layer.

Optionally, the protocol layer structure between the access network device and the terminal device may further include an artificial intelligence (AI) layer, used to transmit data related to an AI function.

(2) Central Unit (CU) and Distributed Unit (DU)

An access device may include a CU and a DU. A plurality of DUs may be controlled by one CU in a centralized manner. For example, an interface between the CU and the DU may be referred to as an F1 interface. A control plane (CP) interface may be F1-C, and a user plane (UP) interface may be F1-U. Specific names of the interfaces are not limited in this disclosure. The CU and the DU may be divided based on protocol layers of the radio network. For example, functions of the PDCP layer and protocol layers above the PDCP layer are set on the CU, and functions of protocol layers below the PDCP layer (for example, the RLC layer and the MAC layer) are set on the DU. For another example, functions of protocol layers above the PDCP layer are set on the CU, and functions of the PDCP layer and protocol layers below the PDCP layer are set on the DU. This is not limited.

Division of processing functions of the CU and the DU based on the protocol layers is merely an example, and the processing functions of the CU and the DU may alternatively be divided in another manner. For example, the CU or the DU may be divided into functions having more protocol layers. For another example, the CU or the DU may be further divided into some processing functions having protocol layers. In a design, some functions of the RLC layer and functions of protocol layers above the RLC layer are set on the CU, and remaining functions of the RLC layer and functions of protocol layers below the RLC layer are set on the DU. In another design, division of functions of the CU or the DU may alternatively be performed based on service types or other system requirements. For example, division may be performed based on latency. Functions whose processing time needs to meet a latency requirement are set on the DU, and functions whose processing time does not need to meet the latency requirement are set on the CU. In another design, the CU may alternatively have one or more functions of the core network. For example, the CU may be disposed on a network side to facilitate centralized management. In another design, a radio unit (RU) of the DU is disposed remotely. Optionally, the RU may have a radio frequency function.

Optionally, the DU and the RU may be divided at a physical layer (PHY). For example, the DU may implement higher-layer functions of the PHY layer, and the RU may implement lower-layer functions of the PHY layer. When the PHY layer is used for sending, the PHY layer may include at least one of the following functions: cyclic redundancy check (CRC) code adding, channel coding, rate matching, scrambling, modulation, layer mapping, precoding, resource mapping, physical antenna mapping, or radio frequency sending. When the PHY layer is used for receiving, the PHY layer may include at least one of the following functions: CRC, channel decoding, de-rate matching, descrambling, demodulation, layer demapping, channel detection, resource demapping, physical antenna demapping, or radio frequency receiving. The higher-layer functions of the PHY layer may include some functions of the PHY layer. For example, the some functions are closer to the MAC layer. The lower-layer functions of the PHY layer may include some other functions of the PHY layer. For example, the some functions are closer to the radio frequency function. For example, the higher-layer functions of the PHY layer may include CRC code adding, channel coding, rate matching, scrambling, modulation, and layer mapping; and the lower-layer functions of the PHY layer may include precoding, resource mapping, physical antenna mapping, and radio frequency sending functions. Alternatively, the higher-layer functions of the PHY layer may include CRC code adding, channel coding, rate matching, scrambling, modulation, layer mapping, and precoding; and the lower-layer functions of the PHY layer may include resource mapping, physical antenna mapping, and radio frequency sending functions. For example, the higher-layer functions of the PHY layer may include CRC, channel decoding, de-rate matching, decoding, demodulation, and layer demapping; and the lower-layer functions of the PHY layer may include channel detection, resource demapping, physical antenna demapping, and radio frequency receiving functions. Alternatively, the higher-layer functions of the PHY layer may include CRC, channel decoding, de-rate matching, decoding, demodulation, layer demapping, and channel detection; and the lower-layer functions of the PHY layer may include resource demapping, physical antenna demapping, and radio frequency receiving functions.

For example, the functions of the CU may be implemented by one entity, or may be implemented by different entities. For example, functions of the CU may be further divided, that is, a control plane and a user plane are separated and implemented by different entities, which are a control plane CU entity (namely, a CU-CP entity) and a user plane CU entity (namely, a CU-UP entity). The CU-CP entity and the CU-UP entity may be coupled to the DU, to jointly complete functions of the access network device.

Optionally, any one of the DU, the CU, the CU-CP, the CU-UP, and the RU may be a software module, a hardware structure, or a combination of a software module and a hardware structure. This is not limited. Different entities may exist in different forms. This is not limited. For example, the DU, the CU, the CU-CP, and the CU-UP are software modules, and the RU is a hardware structure. These modules and methods performed by these modules also fall within the protection scope of this disclosure.

In a possible implementation, the access network device includes a CU-CP, a CU-UP, a DU, and an RU. For example, this disclosure is performed by a DU, or is performed by a DU and an RU, or is performed by a CU-CP, a DU, and an RU, or is performed by a CU-UP, a DU, and an RU. This is not limited. Methods performed by the modules also fall within the protection scope of this disclosure.

The terminal device may alternatively be referred to as a terminal, user equipment (UE), a mobile station, a mobile terminal device, or the like. The terminal device may be widely used to communication in various scenarios, for example, including but not limited to at least one of the following scenarios: device-to-device (D2D), vehicle-to-everything (V2X), machine-type communication (MTC), internet of things (IOT), virtual reality, augmented reality, industrial control, autonomous driving, telemedicine, a smart grid, smart furniture, smart office, smart wearables, smart transportation, a smart city, and the like. The terminal device may be a mobile phone, a tablet computer, a computer with a wireless transceiver function, a wearable device, a vehicle, an uncrewed aerial vehicle, a helicopter, an airplane, a ship, a robot, a robotic arm, a smart home device, or the like. A specific technology and a specific device form used by the terminal device are not limited in this disclosure.

In this disclosure, an apparatus configured to implement a function of a terminal device may be a terminal device, or may be an apparatus that can support the terminal device in implementing the function, for example, a chip system, a hardware circuit, a software module, or a combination of a hardware circuit and a software module. The apparatus may be installed in the terminal device or may be matched with the terminal device for usage. For ease of description, the following describes the technical solutions provided in this disclosure by using an example in which the apparatus configured to implement the function of the terminal device is a terminal device and the terminal device is UE.

The base station and the terminal device may be fixed, or may be movable. The base station and/or the terminal device may be deployed on land, including an indoor or outdoor device, and a handheld or vehicle-mounted device, or may be deployed on water, or may be deployed on an airplane, a balloon, and an artificial satellite in the air. Application scenarios of the base station and the terminal device are not limited in this disclosure. The base station and the terminal device may be deployed in a same scenario or different scenarios. For example, both the base station and the terminal device are deployed on land; or the base station is deployed on land, and the terminal device is deployed on water. Examples are not provided one by one again.

Roles of the base station and the terminal device may be relative. For example, a helicopter or an uncrewed aerial vehicle 120*i* in FIG. 1 may be configured as a mobile base station. For the terminal device 120*j* that accesses the radio access network 100 through 120*i*, the terminal device 120*i* is a base station. However, for the base station 110*a*, 120*i* is a terminal device. In other words, 110*a* and 120*i* communicate with each other based on a radio air interface protocol. 110*a* and 120*i* may alternatively communicate with each other based on an interface protocol between base stations. In this case, for 110*a*, 120*i* is also a base station. Therefore, both the base station and the terminal device may be collectively referred to as a communication apparatus. 110*a* and 110*b* in FIG. 1 may be referred to as a communication apparatus having a function of the base station, and 120*a* to 120*j* in FIG. 1 may be referred to as a communication apparatus having a function of the terminal device.

In this disclosure, the base station sends a downlink signal or downlink information to the terminal device, where the downlink information is carried on a downlink channel; and the terminal device sends an uplink signal or uplink information to the base station, where the uplink information is carried on an uplink channel. The terminal device needs to establish a wireless connection to a cell controlled by the base station, to communicate with the base station. The cell that establishes the wireless connection to the terminal device is referred to as a serving cell of the terminal device. When communicating with the serving cell, the terminal device may further be interfered with by a signal from a neighboring cell.

It may be understood that, in embodiments of this disclosure, a physical downlink shared channel (PDSCH), a physical downlink control channel (PDCCH), a physical uplink shared channel (PUSCH), and a physical uplink control channel (PUCCH) are merely examples of a downlink data channel, a downlink control channel, an uplink data channel, and an uplink control channel. In different systems and different scenarios, the data channel and the control channel may have different names. This is not limited in embodiments of this disclosure.

In this disclosure, an independent network element, for example, an AI network element or an AI node, may be introduced into the communication system shown in FIG. 1, to implement an AI-related operation. The AI-related operation includes at least one of the following: data collection, model training, model information release, model inference, or inference result release. The AI network element may be directly connected to the access network device in the communication system, or may be indirectly connected to the access network device by using a third-party network element. The third-party network element may be a core network element like an authentication management function (AMF) or a user plane function (UPF). Alternatively, an AI function, an AI module, or an AI entity may be configured in another network element in the communication system to implement an AI-related operation. For example, the another network element may be an access network device (like a gNB), a core network device, or operation, administration and maintenance (OAM). In this case, a network element that performs the AI-related operation is a network element with a built-in AI function. The OAM is configured to perform an operation, management, maintenance, and the like on the access network device and/or the core network device.

Figure 2:
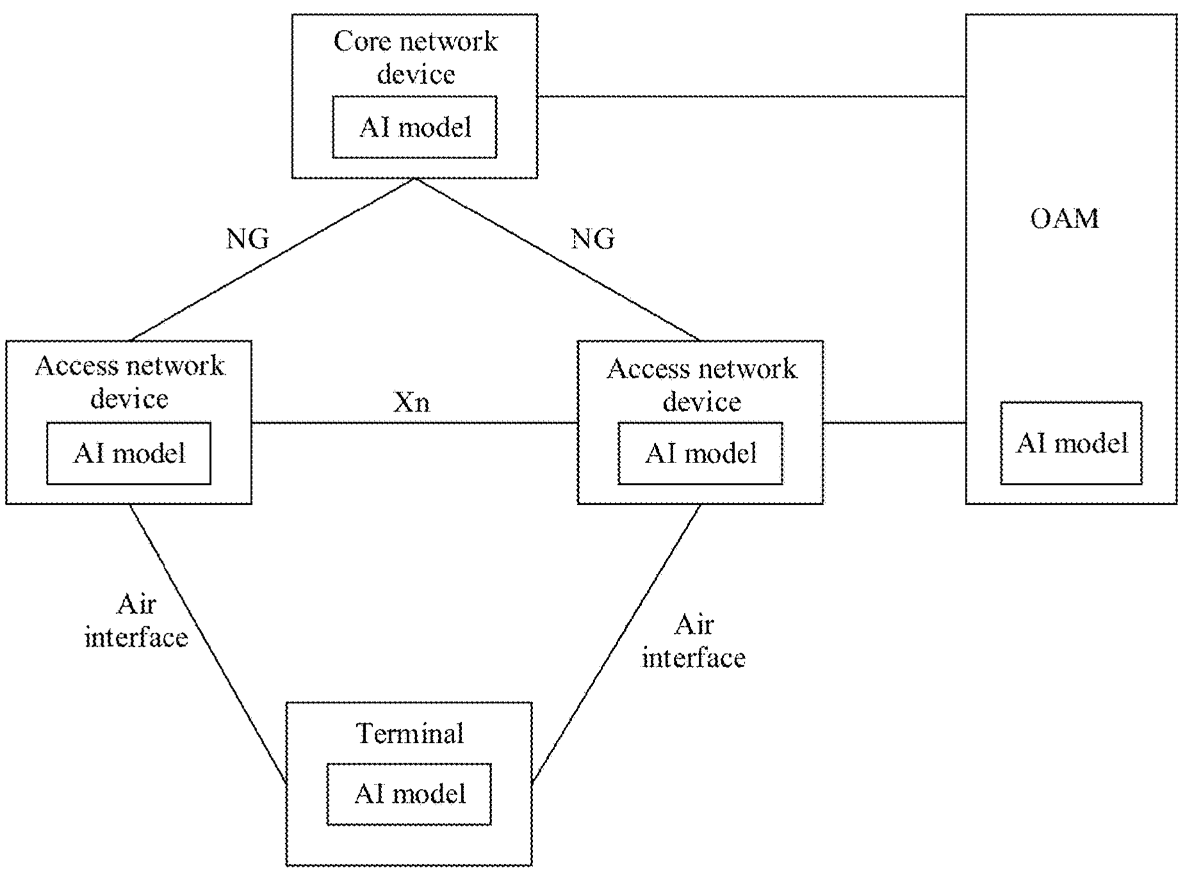
FIG. 2 and FIG. 3 each are a diagram of deployment of an AI model according to this disclosure.
Figure 3:
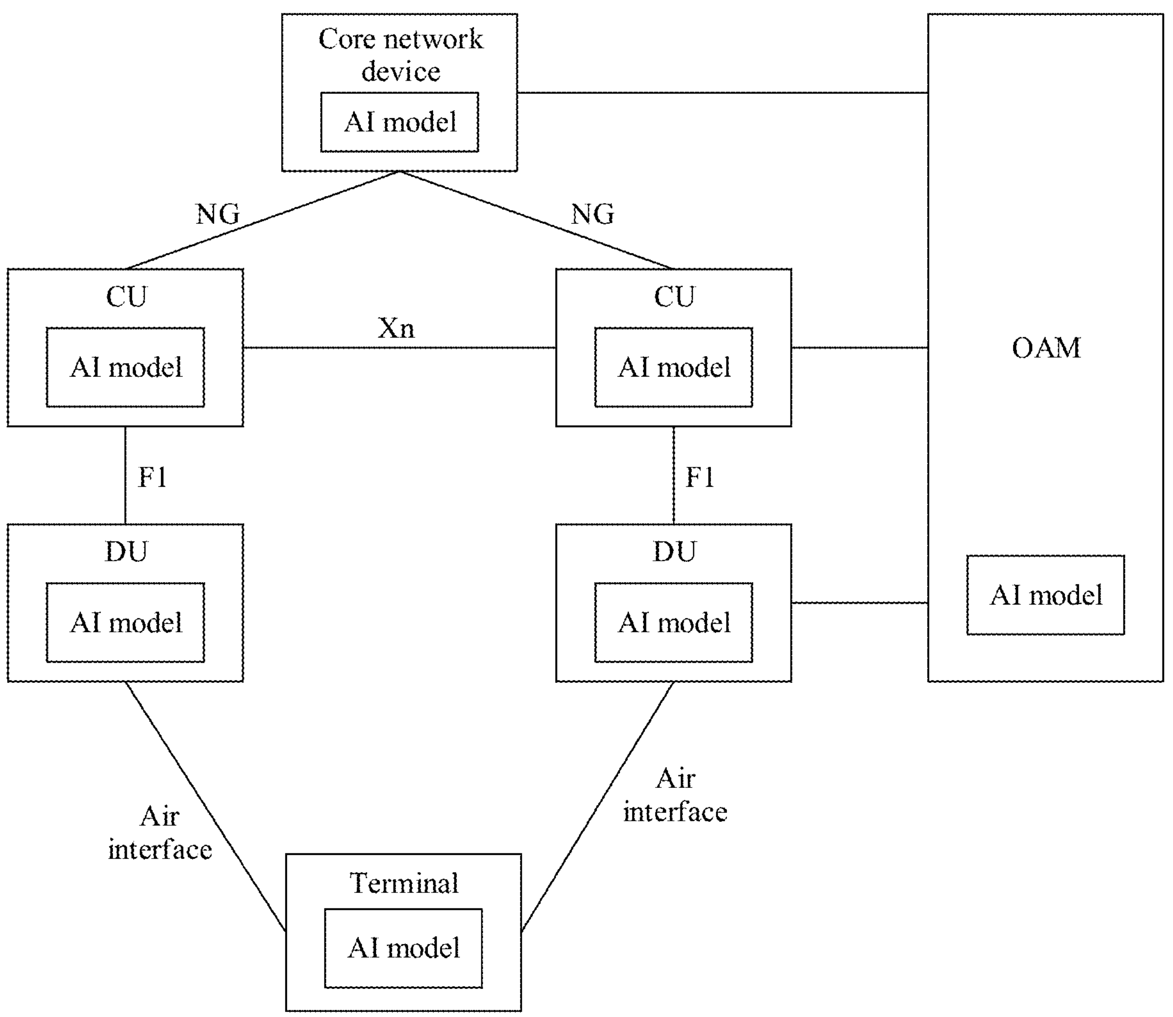

In this disclosure, as shown in FIG. 2 or FIG. 3, an AI model may be deployed on at least one of a core network device, an access network device, a terminal device, OAM, or the like, and a corresponding function is implemented by using the AI model. In this disclosure, AI models deployed on different nodes may be the same or different. That the models are different includes at least one of the following: structure parameters of the models, for example, quantities of layers and/or weight values of the models, are different; input parameters of the models are different; output parameters of the models are different; or the like. That the input parameters of the models and/or the output parameters of the models are different may be described as the following: Functions of the models are different. Different from that in FIG. 2, in FIG. 3, the access network device is split into a CU and a DU in terms of functions. Optionally, the CU and the DU may be a CU and a DU in an O-RAN architecture. One or more AI models may be deployed in the CU. In addition/Alternatively, one or more AI models may be deployed in the DU. Optionally, the CU in FIG. 3 may be further split into a CU-CP and a CU-UP. Optionally, one or more AI models may be deployed in the CU-CP. In addition/Alternatively, one or more AI models may be deployed in the CU-UP. Optionally, in FIG. 2 or FIG. 3, the OAM of the access network device and the OAM of the core network device may be separately and independently deployed.

Figure 4A:
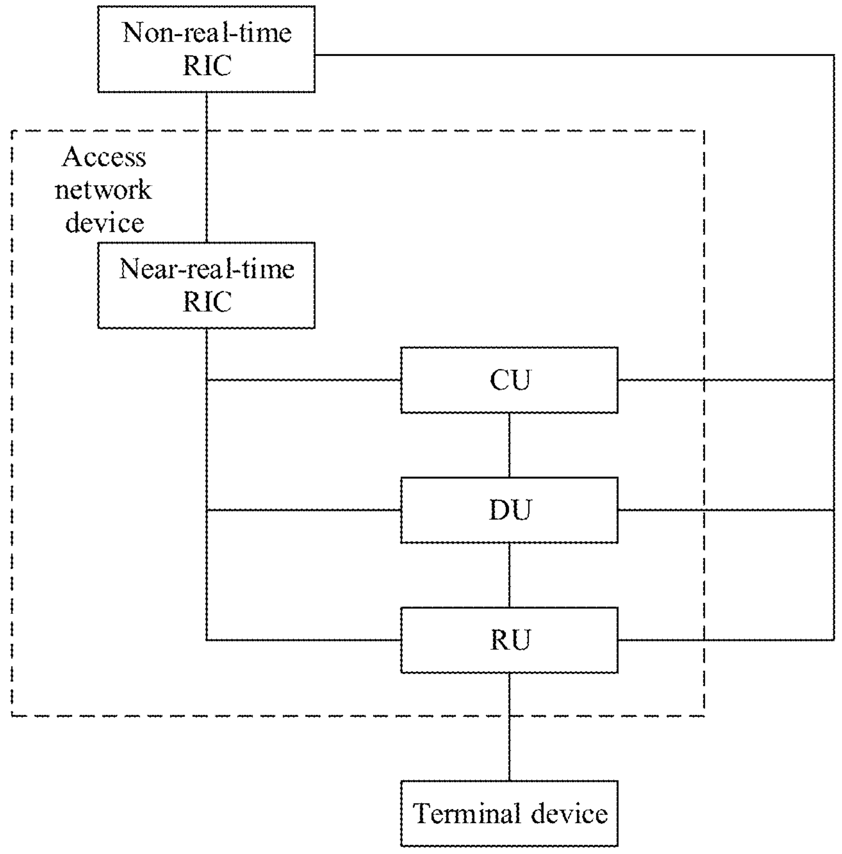
FIG. 4*a* and FIG. 4*b* each are a diagram of an architecture of a communication system according to this disclosure.

Optionally, FIG. 4*a* is an architecture of a communication system according to this disclosure. As shown in FIG. 4*a*, in a first design, the access network device includes a near-real-time radio access network intelligent controller (RIC) module, configured to perform model training and inference. For example, the near-real-time RIC may be configured to train an AI model, and inference is performed by using the AI model. For example, the near-real-time RIC may obtain information on a network side and/or a terminal side from at least one of a CU, a DU, or an RU, and the information may be used as training data or inference data. Optionally, the near-real-time RIC may submit an inference result to at least one of the CU, the DU, the RU, or a terminal device. Optionally, the CU and the DU may exchange the inference result. Optionally, the DU and the RU may exchange the inference result. For example, the near-real-time RIC submits the inference result to the DU, and the DU forwards the inference result to the RU.

Alternatively, in a second design, as shown in FIG. 4*a*, a non-real-time RIC (optionally, the non-real-time RIC may be located in the OAM or the core network device) is included outside the access network device, and is configured to perform model training and inference. For example, the non-real-time RIC is configured to train an AI model, and inference is performed by using the model. For example, the non-real-time RIC may obtain information on the network side and/or the terminal side from at least one of the CU, the DU, or the RU. The information may be used as training data or inference data, and the inference result may be submitted to at least one of the CU, the DU, the RU, or the terminal device. Optionally, the CU and the DU may exchange the inference result. Optionally, the DU and the RU may exchange the inference result. For example, the non-real-time RIC submits the inference result to the DU, and the DU forwards the inference result to the RU.

Alternatively, in a third design, as shown in FIG. 4*a*, the access network device includes a near-real-time RIC, and a non-real-time RIC (optionally, the non-real-time RIC may be located in the OAM or the core network device) is included outside the access network device. Same as that in the foregoing second design, the non-real-time RIC may be configured to perform model training and inference. In addition/Alternatively, same as that in the foregoing first design, the near-real-time RIC may be configured to perform model training and inference. In addition/Alternatively, the non-real-time RIC performs model training, and the near-real-time RIC may obtain AI model information from the non-real-time RIC, obtain information on the network side and/or the terminal side from at least one of the CU, the DU, or the RU, and obtain the inference result by using the information and the AI model information. Optionally, the near-real-time RIC may submit the inference result to at least one of the CU, the DU, the RU, or the terminal device. Optionally, the CU and the DU may exchange the inference result. Optionally, the DU and the RU may exchange the inference result. For example, the near-real-time RIC submits the inference result to the DU, and the DU forwards the inference result to the RU. For example, the near-real-time RIC is configured to: train a model A and perform inference by using the model A. For example, the non-real-time RIC is configured to: train a model B and perform inference by using the model B. For example, the non-real-time RIC is configured to: train a model C, and send information about the model C to the near-real-time RIC. The near-real-time RIC performs inference by using the model C.

Figure 4B:
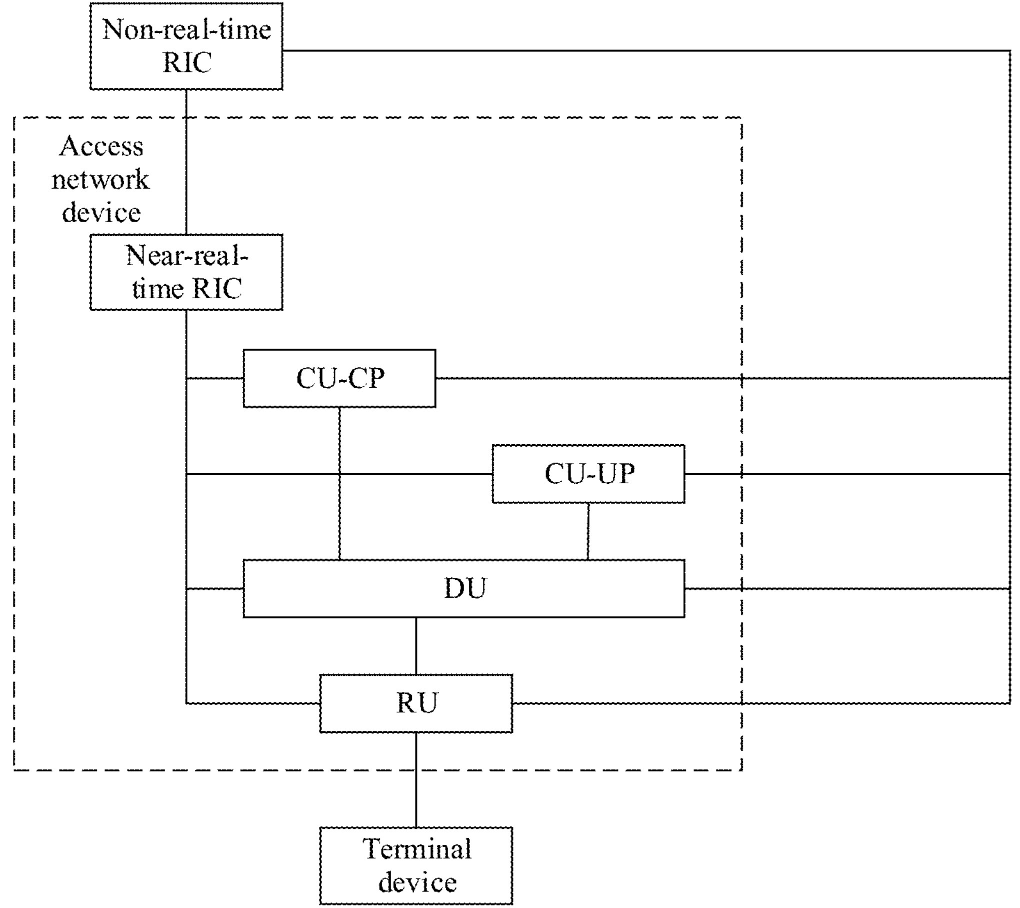

FIG. 4*b* is an architecture of another communication system according to this disclosure. Compared with that in FIG. 4*a*, in FIG. 4*b*, a CU is separated into a CU-CP, a CU-UP, and the like.

Figure 4C:
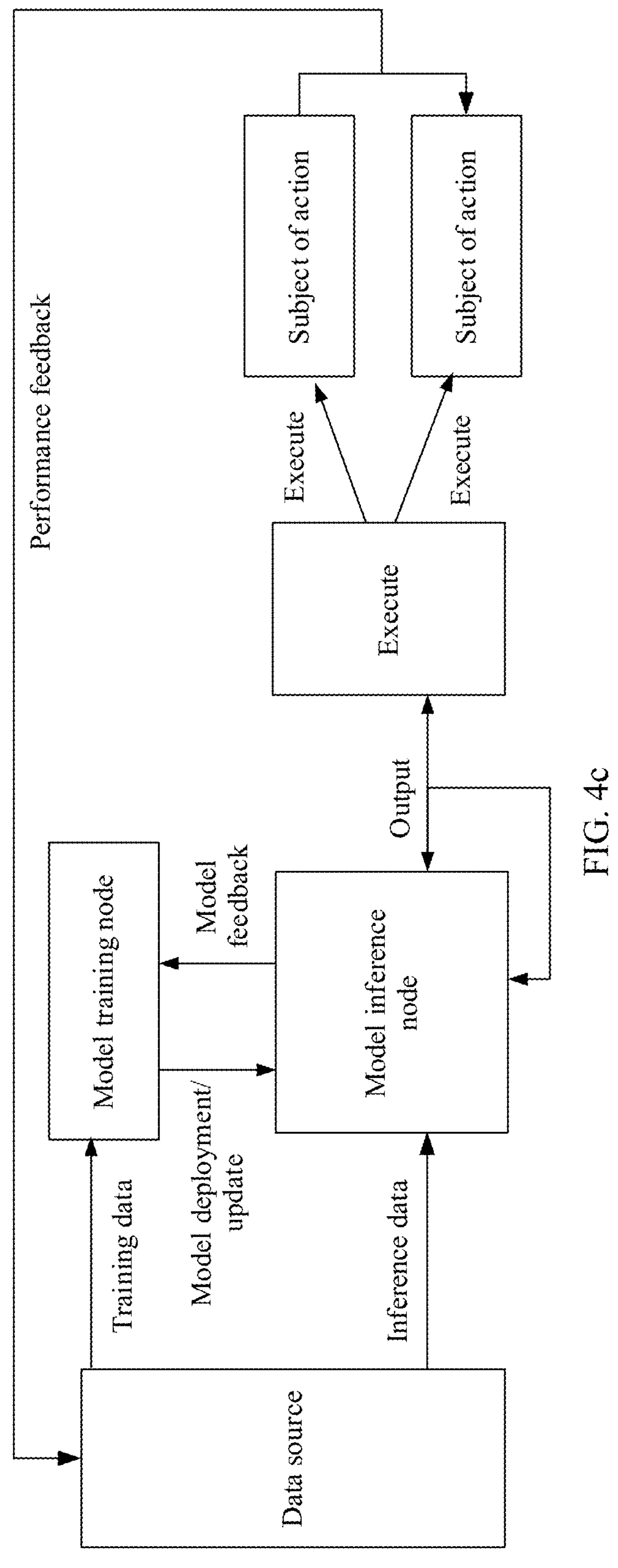
FIG. 4*c* is a diagram of applying an AI model according to this disclosure.

FIG. 4*c* is a diagram of an application framework of AI. A data source is configured to store training data and inference data. A model training node (model training host) analyzes or trains training data provided by the data source to obtain an AI model, and deploys the AI model in a model inference node (model inference host). Optionally, the model training node may further update the AI model that is deployed in the model inference node. The model inference node may further feed back related information of the deployed model to the model training node, so that the model training node performs optimization, update, or the like on the deployed AI model.

The AI model represents a mapping relationship between an input and an output of the model. Obtaining an AI model through learning by the model training node is equivalent to obtaining the mapping relationship between the input and the output of the model through learning by the model training node by using training data. The model inference node uses the AI model to perform inference based on the inference data provided by the data source and obtain an inference result. The method may also be described as follows: The model inference node inputs the inference data to the AI model, and obtains an output by using the AI model. The output is the inference result. The inference result may indicate a configuration parameter used (acted) by a subject of action, and/or an operation performed by the subject of action. The inference result may be planned by an actor entity in a unified manner, and sent to one or more subjects of action (for example, network entities) for action.

In this disclosure, the AI model implements a specific method of an AI function. The AI model may be a neural network or another machine learning model. The AI model may be referred to as a model for short. The neural network is used as an example. The neural network is a specific implementation form of a machine learning technology. According to a universal approximation theorem, the neural network can theoretically approximate to any continuous function, so that the neural network can learn any mapping. A conventional communication system needs to design a communication module with rich expert knowledge. However, a neural network-based deep learning communication system can automatically discover an implicit pattern structure from a large quantity of data sets, establish a mapping relationship between data, and obtain performance better than that of a conventional modeling method.

Figure 5:
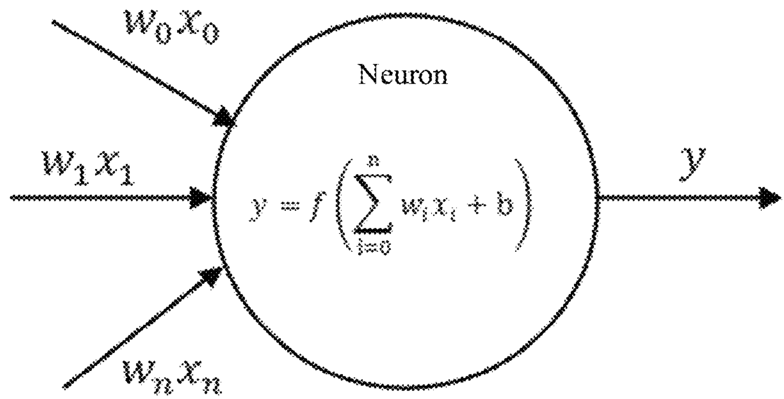
FIG. 5 is a diagram of a neuron according to this disclosure.

The idea of the neural network comes from the neuron structure of brain tissue. Each neuron performs a weighted summation operation on input values of the neuron, and outputs a weighted summation result through an activation function. FIG. 5 is a diagram of a structure of a neuron. It is assumed that inputs of the neuron are $x=[x_0, x_1, \ldots, x_n]$, weight values corresponding to the inputs are respectively $w=[w, w_1, \ldots, w_n]$, and an offset of the weighted summation is b. There may be diversified forms of the activation function. If an activation function of a neuron is $y=f(z)=\max(0, z)$, an output of the neuron is $$y = f\left(\sum_{i=0}^{i=n} w_i * x_i + b\right) = \max\left(0, \sum_{i=0}^{i=n} w_i * x_i + b\right).$$

For another example, if an activation function of a neuron is $y=f(z)=z$, an output of the neuron is $$y = f\left(\sum_{i=0}^{i=n} w_i * x_i + b\right) = \sum_{i=0}^{i=n} w_i * x_i + b.$$

Herein, b may be various possible values such as a decimal, an integer (including 0, a positive integer, a negative integer, or the like), or a complex number. Activation functions of different neurons in the neural network may be the same or different.

Figure 6:
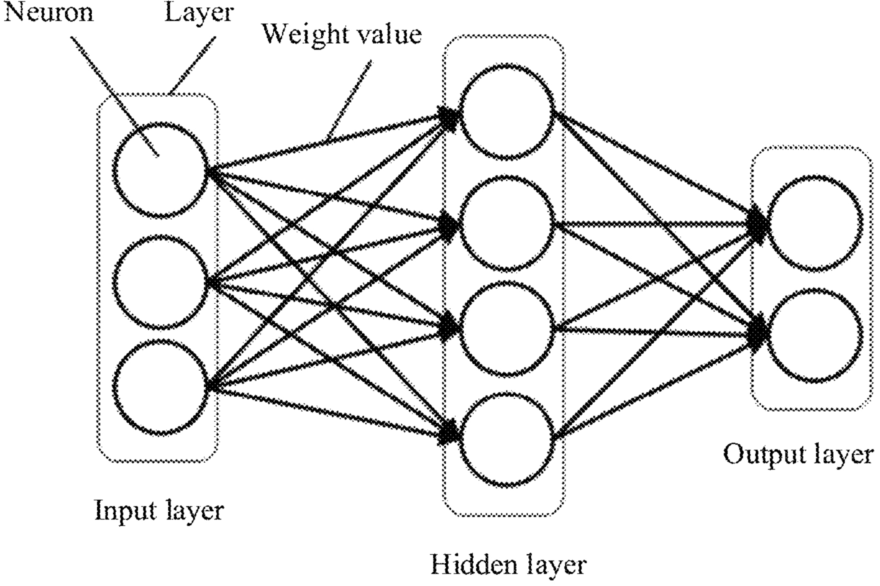
FIG. 6 is a diagram of a neural network according to this disclosure.

The neural network generally includes a multi-layer structure, and each layer may include one or more neurons. Increasing a depth and/or a width of the neural network can improve an expression capability of the neural network, and provide more powerful information extraction and abstract modeling capabilities for complex systems. The depth of the neural network may refer to a quantity of layers included in the neural network, and a quantity of neurons included in each layer may be referred to as a width of the layer. FIG. 6 is a diagram of a layer relationship of a neural network. In an implementation, the neural network includes an input layer and an output layer. After performing neuron processing on a received input, the input layer of the neural network transfers a result to the output layer, and the output layer obtains an output result of the neural network. In another implementation, the neural network includes an input layer, a hidden layer, and an output layer. After performing neuron processing on a received input, the input layer of the neural network transfers a result to an intermediate hidden layer. Then, the hidden layer transfers a calculation result to the output layer or an adjacent hidden layer. Finally, the output layer obtains an output result of the neural network. A neural network may include one hidden layer or a plurality of hidden layers that are sequentially connected. This is not limited. In a training process of the neural network, a loss function may be defined. The loss function describes a gap or a difference between an output value of the neural network and an ideal target value. A specific form of the loss function is not limited in this disclosure. The training process of the neural network is a process of adjusting neural network parameters such as a quantity of layers and a width of the neural network, a weight value of a neuron, and/or a parameter in an activation function of a neuron, so that a value of a loss function is less than a threshold or meets a target requirement.

The neural network includes a deep neural network (DNN). Based on a network construction manner, DNNs may be classified into a feedforward neural network (FNN), a convolutional neural network (CNN), a recurrent neural network (RNN), and the like. In this disclosure, the AI model may be an FNN, a CNN, an RNN, or the like, or may be another type of neural network or the like. This is not limited.

In a wireless communication system, there is an uplink communication link and a downlink communication link. A link on which a terminal device sends an uplink signal or uplink information to a base station is referred to as the uplink communication link, and a link on which a base station sends a downlink signal or downlink information to a terminal device is referred to as the downlink communication link. For more than a decade in the past, because most data in a wireless network is downlink communication data, the downlink communication link has been paid most attention. In recent years, with emergence of services such as live broadcast and high-definition video calls, uplink communication requirements become increasingly urgent. How to improve an uplink communication rate is a current research direction.

An uplink precoding technology is an important way to improve the uplink communication rate. In the uplink precoding technology, a plurality of antennas (or referred to as antenna ports) of UE are used to assign a respective weight value to data sent by each antenna, to achieve beamforming effect, so that a signal sent by the UE better matches a channel condition between the UE and a base station. For example, if a signal sent by a terminal device is X, an uplink channel is H, an uplink precoding matrix is W, and noise is $N_0$, an uplink signal sent by the UE is $S=WX$, and an uplink signal received by the base station is $Y=HWX+N_0$.

Because it is expected that the precoding matrix W matches the uplink channel H as much as possible, the base station may first estimate the uplink channel H, calculate the corresponding precoding matrix W, and then notify the UE of W for uplink precoding. A format of W is usually a complex array, namely:

$$W=[w_1, w_2, \ldots, w_N]^T$$

Herein, N indicates a quantity of antennas of the UE; and $w_i$ indicates a weight value assigned to an $i^{th}$ antenna, where $w_i$ is a floating-point complex number, and a value of i ranges from 1 to N. When the base station notifies the UE of precise W, a large quantity of air interface overheads need to be consumed. In addition, when a quantity of UEs increases, feedback overheads increase exponentially. This severely affects air interface efficiency of a wireless network. Therefore, how to notify the UE of the precoding matrix W with low air interface overheads is an urgent problem to be resolved.

In a possible implementation, codebook-based uplink transmission may be defined, and a principle thereof is as follows: A series of fixed precoding codebooks (CB) are agreed upon, which are respectively applicable to cases in which the UE has different quantities of antennas. Each codebook includes several precoding matrices that are different from each other. During uplink data transmission, the base station notifies the UE to select a precoding matrix in the codebook, to precode an uplink signal. For example, for UE having four antennas, an agreed fixed codebook CB=$[W_1, W_2, \ldots, W_4]$ includes four optional precoding matrices $W_i$, where $W_i=[w_1, w_2, \ldots, w_4]^T$.

Figure 7:
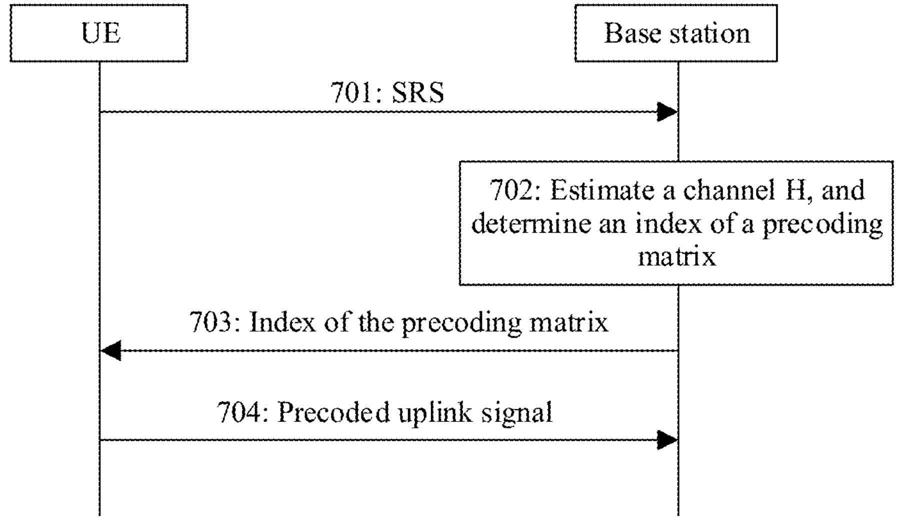
FIG. 7, FIG. 8, FIG. 10, FIG. 13, and FIG. 14 each are a diagram of an uplink precoding method according to this disclosure.

In a design, as shown in FIG. 7, a procedure in which a base station notifies UE of a precoding matrix includes the following steps.

Step 701: UE sends a sounding reference signal (SRS) to a base station.

Step 702: The base station estimates an uplink channel H based on measurement performed on the SRS, and selects, from a predefined CB, a precoding matrix that matches H.

Step 703: The base station notifies the UE of an index of the selected precoding matrix.

Step 704: After receiving the index, the UE determines, based on the predefined codebook, the precoding matrix corresponding to the index, and precode an uplink signal based on the precoding matrix.

In the foregoing design, the base station no longer notifies the UE of the precoding matrix W. W is a floating-point complex number matrix, and a data volume thereof is large.

Instead, the base station notifies the UE of the index of the precoding matrix W. An index is usually a small integer, and a data volume thereof is small, so that air interface overheads can be significantly reduced. However, in this design, the agreed codebook is a universal fixed codebook, all UEs use a same codebook, and a quantity of candidate precoding matrices in the codebook is small. Therefore, this design lacks flexibility. For example, in a possible design, 360 degrees are divided into only four equal parts based on a 4-antenna codebook, and each precoding matrix points to one equally divided angle. Therefore, indication precision is excessively low. In practice, channel environments in which different UEs are located differ greatly. For example, some channels mainly use a direct multipath, and some channels mainly use a scattering multipath. Signals have different directions of arrival and channel characteristics. One fixed codebook cannot match ever-changing channel environments. In addition, a precoding matrix in the codebook usually differs greatly from an optimal precoding matrix, and accordingly, beamforming gain effect of the precoding matrix is greatly reduced. For example, it is found through simulation that, for UE having four antennas, a precoding matrix selected from an agreed codebook has a demodulation loss of about 1.2 dB compared with an optimally designed precoding matrix. This indicates that the agreed codebook still has much room for improvement.

Figure 8:
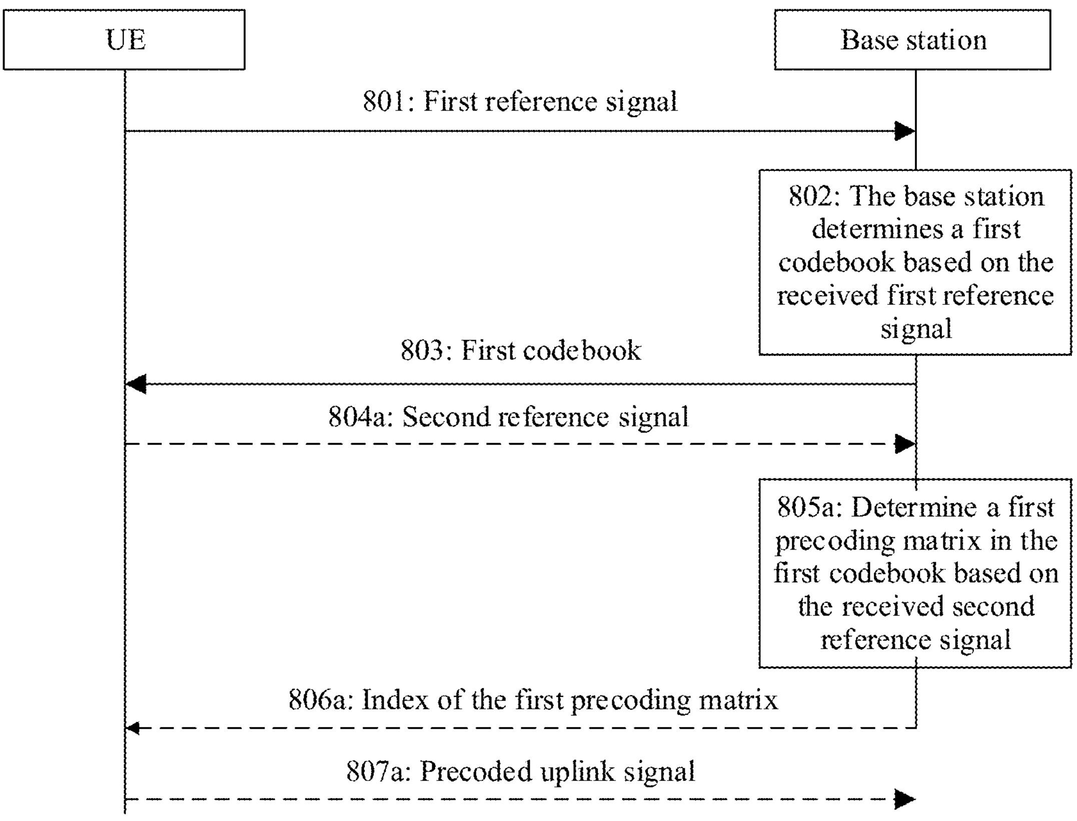

This disclosure provides an uplink precoding method. In the method, a personalized codebook may be configured for each UE, so that the codebook better matches an actual channel environment of the UE. This improves precoding precision of the UE. As shown in FIG. 8, the method includes at least the following steps.

Step 801: UE sends a first reference signal to a base station; and correspondingly, the base station receives the first reference signal from the UE.

The first reference signal may be an SRS, another uplink reference signal, or the like.

Step 802: The base station determines a first codebook based on the received first reference signal, where the first codebook is used to precode an uplink signal. Optionally, a granularity of the first codebook is not limited. For example, a codebook may be configured for the UE for an entire uplink bandwidth, that is, the first codebook may be applicable to precoding of the entire uplink bandwidth. Alternatively, for each sub-band in the uplink bandwidth, the base station may separately configure a codebook or the like for the UE. For example, the base station configures the first codebook for a first sub-band, where the first codebook is applicable to precoding the first sub-band, and the like.

For example, the UE may separately send Z reference signals on Z resources. The Z resources may be distinguished in time domain, frequency domain, space domain, and/or the like, where Z is a positive integer greater than 0. For example, the UE may separately send the Z reference signals at Z moments. In this case, the Z resources are distinguished in time domain. The base station separately measures the received Z reference signals, to obtain uplink channel information. The uplink channel information may be a characteristic matrix H of an uplink channel. For ease of description, the characteristic matrix H of the uplink channel may alternatively be referred to as an uplink channel H. The first codebook is determined based on Z pieces of uplink channel information, where the first codebook may be referred to as a personalized codebook of the UE.

In an implementation, the base station may determine the first codebook based on the Z pieces of uplink channel information and a codebook generation model. The codebook generation model is used to determine the first codebook based on the Z pieces of uplink channel information. A name of the codebook generation model is not limited. For example, the codebook generation model may alternatively be referred to as a model, an AI model, or the like.

Figure 9:
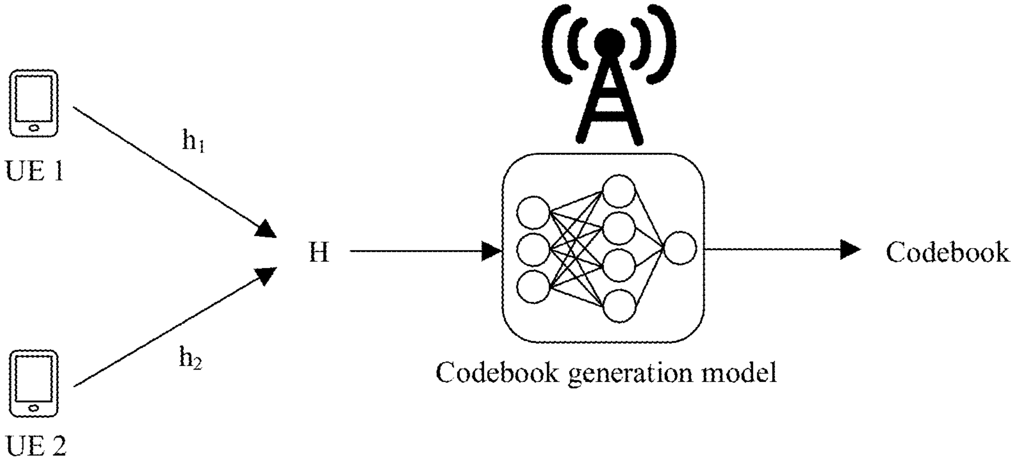
FIG. 9 is a diagram of a codebook generation process according to this disclosure.

For example, the Z pieces of uplink channel information, for example, Z Hs, may be used as an input of the codebook generation model, and an output of the codebook generation model is the first codebook. For example, as shown in FIG. 9, uplink channel information h1 corresponding to UE 1 is input into a codebook generation model, and an output is a codebook corresponding to the UE 1; and uplink channel information h2 corresponding to UE 2 is input into the codebook generation model, and an output is a codebook corresponding to the UE 2. Alternatively, processing may be performed on the Z pieces of uplink channel information. The processing includes but is not limited to: quantizing the Z Hs, separating a real part from an imaginary part, separating a phase from an amplitude, or the like. Processed Z Hs are used as an input of the codebook generation model. In addition/Alternatively, the output of the codebook generation model is information related to the first codebook, and the first codebook is determined based on the output of the codebook generation model. For example, the first codebook may include Z precoding matrices, or Z quantized precoding matrices, or M precoding matrices, or M quantized precoding matrices, where a value of M is a positive integer less than or equal to Z and greater than 0. For example, the output of the codebook generation model is Z precoding matrices. The base station may further need to cluster the Z precoding matrices to generate M precoding matrices; and quantize the M precoding matrices, where the first codebook includes M quantized precoding matrices and the like. Certainly, it may alternatively be directly designed that the output of the codebook generation model is M quantized precoding matrices or the like.

It should be noted that, in the foregoing description, an example in which the base station determines the first codebook of the single UE based on the Z pieces of channel information of the single UE is used for description. In another solution, it is set that a plurality of UEs send uplink reference signals on a same resource. In this case, uplink channel information corresponding to the UE may be obtained based on an uplink reference signal sent by each UE. The base station may determine, based on the uplink channel information corresponding to the plurality of UEs and a codebook generation model, a codebook applicable to the plurality of UEs. For example, the base station simultaneously serves two UEs, and the two UEs send reference signals on a same resource. For the reference signal sent by the UE 1, the base station determines uplink channel information h1, and for the reference signal sent by the UE 2, the base station determines uplink channel information h2. In this case, the base station may use cascaded H={h1, h2} of channels of the foregoing two UEs as an input of the codebook generation model, and output a codebook shared by the UE 1 and the UE 2. Alternatively, the base station processes cascaded H of channels of the plurality of UEs, and processed information is used as an input of the codebook generation model, and/or an output of the codebook generation model is information other than the shared codebook of the plurality of UEs. The base station further processes other information output by the codebook generation model, to determine the codebook shared by the plurality of UEs, and the like.

In another implementation, the base station may determine Z precoding matrices based on Z pieces of uplink channel information. The base station calculates the Z precoding matrices based on the Z pieces of uplink channel information H. A calculation method thereof may include: a weighted minimum mean square error (WMMSE) method, a zero forcing (ZF) method, another method, or the like. The base station may determine the first codebook based on the Z precoding matrices.

The first codebook includes the Z precoding matrices, and the precoding matrix in the codebook may alternatively be referred to as a codeword. Further, the Z precoding matrices may be quantized, and the first codebook includes Z quantized precoding matrices. Alternatively, M precoding matrices are determined based on the Z precoding matrices and a precoding matrix generation model, where M is less than or equal to Z. The precoding matrix generation model is used to converge the Z precoding matrices into the M precoding matrices. In this disclosure, a name of the precoding matrix generation model is not limited. For example, the precoding matrix generation model may be referred to as a model, an AI model, or the like. In this design, the Z precoding matrices may be directly used as the input of the precoding matrix generation model, to be input to the precoding matrix generation model. The output of the precoding matrix generation model is the first codebook. Alternatively, the Z precoding matrices may be processed, and processed Z precoding matrices are used as the input of the precoding matrix generation model, and/or the output of the precoding matrix generation model may alternatively be other information related to the first codebook, and the other information is processed, so that the first codebook can be obtained, or the like. The first codebook includes a small quantity of precoding matrices. Therefore, when the base station subsequently indicates an index of a precoding matrix in the first codebook to the UE, required signaling overheads are low. Alternatively, in addition to the foregoing AI method, the Z precoding matrices may be clustered into the M precoding matrices by using a clustering method. The clustering method includes but is not limited to: a K-means method, a bidirectional K-means method, a hierarchical clustering method, and the like. Further, the M precoding matrices may be quantized, to obtain M quantized precoding matrices, where the first codebook includes the M quantized precoding matrices.

It should be noted that, in the foregoing description, an example in which the base station obtains the precoding matrix of the single UE by measuring the uplink reference signal of the single UE, and determines the first codebook of the single UE based on the precoding matrix of the single UE is used for description. In a design, if a base station simultaneously serves a plurality of UEs, and the plurality of UEs occupy same resources, the base station may determine, based on a reference signal sent by each UE, uplink channel information corresponding to the UE. Further, a precoding matrix corresponding to each UE is determined based on the uplink channel information corresponding to each UE. A codebook applicable to the plurality of UEs is determined based on the precoding matrices corresponding to the plurality of UEs, and the like. For example, a system includes two UEs. The two UEs occupy same resources, and a quantity of the same resources is Z. In this case, Z1 precoding matrices are determined for reference signals sent by the UE 1 on the Z resources. Z2 precoding matrices are determined for reference signals sent by the UE 2 on the Z resources. In a design, a codebook applicable to both the UE 1 and the UE 2 includes (Z1+Z2) precoding matrices, or the codebook applicable to both the UE 1 and the UE 2 includes quantized (Z1+Z2) precoding matrices. Alternatively, the base station may converge the (Z1+Z2) precoding matrices to obtain M precoding matrices. The codebook applicable to both the UE 1 and the UE 2 includes the M precoding matrices, quantized M precoding matrices, or the like.

Alternatively, the process in step 802 may be described as follows: The base station estimates an uplink channel based on the reference signal sent by the UE, and calculates a precoding matrix matching the uplink channel. Optionally, a value range of a calculated precoding matrix W is a complex matrix in continuous space. A first codebook is determined based on a plurality of precoding matrices W calculated by a single UE at a plurality of moments. A quantity of the plurality of precoding matrices is Z. For a process of determining the first codebook based on the Z precoding matrices, refer to the foregoing descriptions.

Step 803: The base station sends the first codebook to the UE; and correspondingly, the UE receives the first codebook from the base station.

According to the foregoing method, the base station may configure a personalized codebook for the UE. The personalized codebook may better match a channel characteristic of the UE. Beams corresponding to a precoding matrix of the personalized codebook are no longer evenly divided in space, and may be finely divided in a main direction of arrival. This improves precoding precision of the UE.

It should be noted that in the foregoing descriptions, the base station may need to deploy a codebook generation model or a precoding matrix generation model. In this disclosure, any model in the base station may be trained offline or online by the base station, or may be sent to the base station after being trained by another third-party node. This is not limited. In a training process of the codebook generation model, supervised learning is used as an example. Training data includes a training sample and a label. The training samples are Z pieces of uplink channel information. The label is a codebook, and the codebook is M quantized precoding matrices or the like. In this case, a model training node may determine an output of the codebook generation model based on the Z pieces of uplink channel information and the codebook generation model, and determine a value of a loss function based on the output of the codebook generation model and the label. If the value of the loss function is less than (or less than or equal to) a threshold or meets a target requirement, the training is completed. In this disclosure, that the value of the loss function is less than (or less than or equal to) a threshold or meets a target requirement includes: For one or more training samples, values of loss functions of all training samples are less than (or less than or equal to) the threshold or meet the target requirement; or a weighted summation value, for example, an average value, of loss functions of all training samples is less than (or less than or equal to) the threshold or meets the target requirement. Otherwise, parameters in the codebook generation model are adjusted, and model training continues. If the codebook generation model is a neural network, any one of the following parameters in the model may be adjusted in a training process: a quantity of layers of the neural network, a width of the neural network, a connection relationship between layers, a weight value of a neuron, an activation function of the neuron, an offset in the activation function, or the like, so that a difference between an output of a neural network element and an ideal target value is as small as possible. A training process of the precoding matrix generation model is similar to the training process of the codebook generation model. Details are not described again. In the foregoing descriptions, supervised learning is used as an example for description. This is not limited. For example, in a training process, unsupervised learning, reinforcement learning, or the like may be further used.

Optionally, in addition to step 801 to step 803, the procedure shown in FIG. 8 may further include the following steps.

Step 804*a*: The UE sends a second reference signal to the base station; and correspondingly, the base station receives the second reference signal from the UE. The second reference signal may be an SRS, another uplink reference signal, or the like. This is not limited.

Step 805*a*: The base station determines a first precoding matrix in the first codebook based on the received second reference signal.

For example, the base station determines the uplink channel H based on the received reference signal. The base station determines the first precoding matrix in the first codebook based on the uplink channel H. For example, the first codebook includes n precoding matrices. For an $i^{th}$ precoding matrix, i is a positive integer greater than or equal to 1 and less than or equal to n. When the base station performs analog calculation on precoding on the uplink channel H by using the $i^{th}$ precoding matrix, the base station corresponds to an uplink transmission indicator. The uplink transmission indicator includes at least one of the following: an uplink signal to interference plus noise ratio, an uplink throughput, or the like. The base station selects, from the n precoding matrices included in the first codebook, a precoding matrix with an optimal uplink transmission indicator as the first precoding matrix notified to the UE. For example, a precoding matrix with a largest signal to interference plus noise ratio is selected as the first precoding matrix, or a precoding matrix with a largest uplink throughput is selected as the first precoding matrix.

For example, in an implementation, the base station determines, based on an uplink channel $H_i$ that is of an $i^{th}$ UE and that is estimated at a current moment, the first precoding matrix corresponding to the $i^{th}$ UE. Similar to that in the foregoing descriptions, it is set that the first codebook includes n precoding matrices. For each precoding matrix in the n precoding matrices, an uplink throughput corresponding to the precoding matrix when the precoding matrix precodes the uplink channel $H_i$ is calculated. In the first codebook, the precoding matrix with a largest uplink throughput is selected as the first precoding matrix notified to the UE. For example, a possible formula for calculating the uplink throughput by the base station through simulation is as follows:

$$\log\left(1+\frac{|H_iP_i|}{\sum_{k\neq i}|H_kP_k|+\sigma^2}\right)$$

Herein, $|H_iP_i|$ represents equivalent signal power of a precoded uplink signal of the $it^h$ UE; $|H_kP_k|$ represents interference power caused by UE other than the $i^{th}$ UE to the $i^{th}$ UE; $\sigma^2$ represents noise power;

$$\frac{|H_iP_i|}{\sum_{k\neq i}|H_kP_k|+\sigma^2}$$

represents a signal to interference plus noise ratio, namely, an SINR, of the $i^{th}$ UE; and an uplink throughput of the $i^{th}$ UE can be determined by taking a logarithm of (that is, performing an lg( ) operation on) the SINR of the $i^{th}$ UE.

Step 806*a*: The base station sends an index of the first precoding matrix to the UE, where the index of the first precoding matrix may be referred to as a first index; and correspondingly, the UE receives the index of the first precoding matrix from the base station.

In this disclosure, when receiving the index of the first precoding matrix, namely, the first index, the UE may determine, based on the first codebook, the first precoding matrix P corresponding to the first index, and precode an uplink signal by using the precoding matrix P. For example, a precoded signal may be represented as: S=PX, where X represents unprecoded information, and S represents a precoded signal that is actually transmitted.

Step 807*a*: The UE sends a precoded uplink signal to the base station; and correspondingly, the base station receives the precoded uplink signal from the UE.

According to the foregoing descriptions, the base station preconfigures a personalized codebook for the UE; and when the UE actually performs uplink transmission, the base station indicates a precoding matrix in the personalized codebook to the UE. Compared with a manner of configuring a fixed codebook for the UE, this manner can improve precoding precision and channel matching. In addition, the personalized codebook is configured for the UE, so that multi-user interference can be avoided to some extent.

Figure 10:
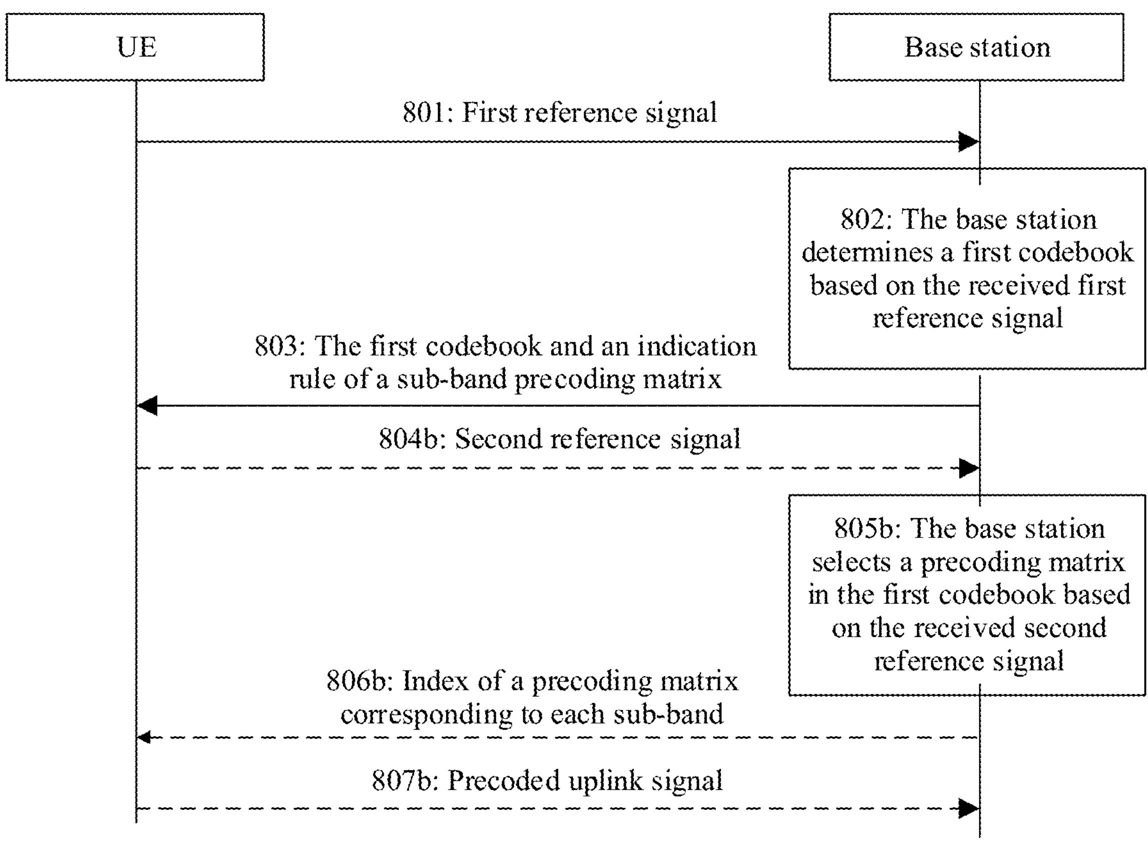

In the foregoing descriptions of FIG. 8, in the entire bandwidth, the base station indicates only one precoding matrix to the UE. The UE precodes, by using the precoding matrix indicated by the base station, an uplink signal corresponding to the bandwidth. In this case, the UE precodes the uplink signal on the entire bandwidth by using the same precoding matrix. Due to frequency selectivity of channels, channels on each sub-band are usually different. This disclosure provides a solution: A base station indicates a precoding matrix to UE in a unit of a sub-band included in a bandwidth. For example, if the entire bandwidth includes X sub-bands, the base station may separately indicate a corresponding precoding matrix for each of the X sub-bands, where X is a positive integer greater than 0. As shown in FIG. 10, a flowchart of an uplink precoding method is provided. In addition to the foregoing step 801 to step 803, optionally, a procedure may further include the following steps.

Step 804*b*: The UE sends a second reference signal to the base station; and correspondingly, the base station receives the second reference signal from the UE.

Step 805*b*: The base station selects a precoding matrix in the first codebook based on the received second reference signal.

In this disclosure, the base station may determine, based on the received second reference signal, an uplink channel H corresponding to each sub-band in an uplink bandwidth of the UE, and determine, based on H corresponding to each sub-band, a precoding matrix corresponding to each sub-band. For example, for any one of at least one sub-band included in the uplink bandwidth, it is set that the first codebook includes n precoding matrices, and the base station may perform simulation calculation to obtain a corresponding uplink signal to interference plus noise ratio or a corresponding uplink throughput when H corresponding to the sub-band is separately precoded by using each of the n precoding matrices. The base station selects, from the n precoding matrices, a precoding matrix with a largest uplink signal to interference plus noise ratio or a largest uplink throughput as a precoding matrix of the sub-band.

Step 806*b*: The base station sends, to the UE, an index of the precoding matrix corresponding to each sub-band.

For example, the base station directly notifies the UE of the index of the precoding matrix corresponding to each sub-band. For example, the uplink bandwidth of the UE includes two sub-bands: a sub-band 1 and a sub-band 2. The first codebook includes two precoding matrices: a precoding matrix 1 and a precoding matrix 2. In this case, the base station may notify the UE of a precoding matrix corresponding to the sub-band 1, for example, the precoding matrix 1, and a precoding matrix corresponding to the sub-band 2, for example, the precoding matrix 2.

Alternatively, due to continuous variation of a radio channel in frequency domain, although channels of sub-bands are not exactly the same, there is correlation between adjacent sub-bands. Therefore, there is also correlation between precoding matrices of the adjacent sub-bands to some extent. In this disclosure, the base station may indicate precoding matrices of different sub-bands to the UE by using the correlation between the precoding matrices of the adjacent sub-bands. In this case, an indication rule of a sub-band precoding matrix may be agreed on in a protocol, or the base station may notify the UE of an indication rule of the sub-band precoding matrix in advance. For example, in step 803, the base station notifies the UE of both the first codebook and the indication rule of the sub-band precoding matrix. In other words, in the foregoing step 803, in addition to sending the first codebook to the UE, the base station further needs to send the indication rule of the sub-band precoding matrix to the UE. For example, at least one indication rule may be preconfigured or predefined. The base station notifies the UE of a specific indication rule to be used, and sends, to the UE, the precoding matrix corresponding to each sub-band, and the like. For example, an uplink channel bandwidth includes a first subband and a second subband, and the first sub-band and the second sub-band are adjacent sub-bands. In this case, the indication rule of the sub-band precoding matrix includes: for a precoding matrix corresponding to the first sub-band, indicating an index of the precoding matrix corresponding to the first sub-band; and for a precoding matrix corresponding to the second sub-band, indicating an offset direction and an offset value of an index of the precoding matrix of the second sub-band relative to the index of the precoding matrix of the first sub-band. The offset direction includes whether the index of the precoding matrix corresponding to the second sub-band increases or decreases relative to the index of the precoding matrix corresponding to the first sub-band. For example, an increase may be represented by 1, and a decrease may be represented by 0. The offset value includes an absolute value of a difference between the index of the precoding matrix corresponding to the second sub-band and the index of the precoding matrix corresponding to the first sub-band. For example, if the index of the precoding matrix corresponding to the second sub-band is X, and the index of the precoding matrix corresponding to the first sub-band is Y, the offset value of the two sub-bands is $|X-Y|$. Compared with the foregoing manner of directly indicating the precoding matrix index corresponding to each sub-band, this indication method can reduce overheads for indicating the index of the precoding matrix.

Figure 11:
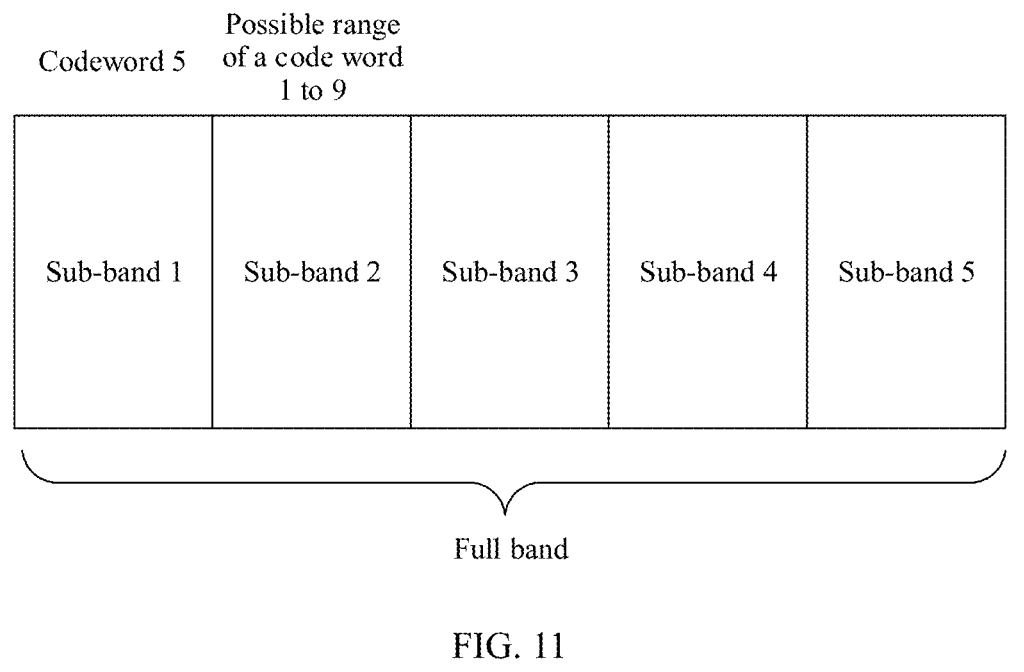

For example, the first codebook configured by the base station for the UE includes 32 precoding matrices, and an index of each precoding matrix may be represented by using 5 bits. In addition, if the entire uplink bandwidth of the UE is divided into five consecutive sub-bands, in a solution of directly indicating an index of a precoding matrix corresponding to each sub-band, overheads of 5*5=25 bits are required for the base station to indicate, to the UE, the index of the precoding matrix corresponding to each sub-band. If correlation between sub-bands is used to indicate an index variation between the sub-bands, overheads for indicating the precoding matrix can be reduced. It is found through research that a precoding matrix index change between adjacent sub-bands usually does not exceed a specific value. For example, the value may be 4. For example, as shown in FIG. 11, if an index of a precoding matrix of a sub-band 1 is 5, a value range of an index of a precoding matrix of a sub-band 2 that is adjacent to the sub-band 1 is 1 to 9. In this case, a variation of the precoding matrix of the sub-band 2 relative to the precoding matrix of the sub-band 1 may be represented by using 3 bits. 1 bit represents whether the index of the precoding matrix of the sub-band 2 increases or decreases relative to the index of the precoding matrix of the sub-band 1. 2 bits represent an offset value between the index of the precoding matrix of the sub-band 2 and the index of the precoding matrix of the sub-band 1. In the example in which the entire uplink bandwidth is divided into five consecutive sub-bands, a precoding matrix of a sub-band 1 needs to be indicated by using 5 bits, and each of precoding matrices of a sub-band 2 to a sub-band 5 needs to be indicated by using 3 bits. Therefore, the precoding matrices of the five sub-bands need to be indicated by using 5+3+3+3+3=17 bits in total. Compared with the foregoing solution in which the precoding matrices of the five sub-bands need to be indicated by using 25 bits in total, this method can reduce overheads for indicating the precoding matrix.

Step 807*b*: The UE sends a precoded uplink signal to the base station; and correspondingly, the base station receives the precoded uplink signal from the UE.

In this disclosure, the base station indicates, to the UE, the precoding matrix corresponding to each sub-band in the entire bandwidth, and the UE precodes, based on the corresponding precoding matrix, an uplink signal transmitted on the corresponding sub-band. The foregoing example is still used. The entire uplink bandwidth is divided into five sub-bands, and the sub-band 1 to the sub-band 5 respectively correspond to precoding matrices P1 to P5. The UE separately precodes, by using P1 to P5, uplink signals corresponding to the sub-band 1 to the sub-band 5. The sub-band 1 is used as an example. A signal transmitted by the UE on the sub-band 1 is represented as S=P1X1, where X1 is an unprecoded uplink signal on the sub-band 1.

Figure 12:
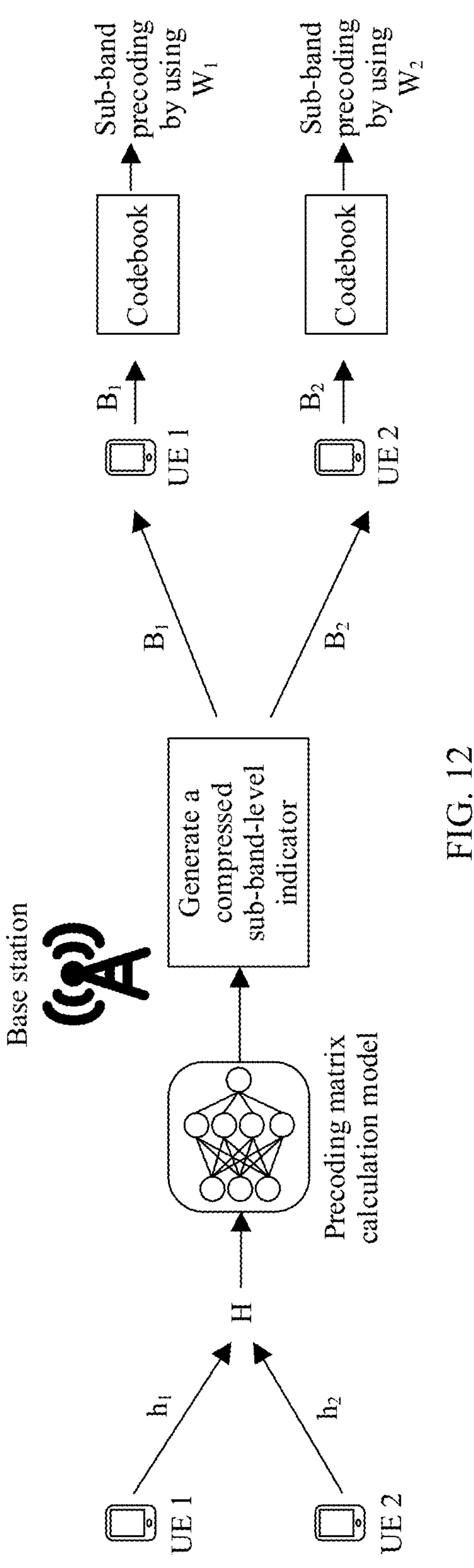
FIG. 12 is a diagram of generating a sub-band precoding matrix according to this disclosure.

It should be noted that, in the procedure in FIG. 10, a process in which the base station determines the precoding matrices corresponding to different sub-bands may be implemented in an AI manner. For example, as shown in FIG. 12, an uplink channel h1 of UE 1 is input to a precoding matrix calculation model, and an output of the model is a precoding matrix corresponding to each sub-band in a full-band uplink channel corresponding to the UE 1. In addition, indication information of the precoding matrix corresponding to each sub-band of the UE1 is determined based on the indication rule of the sub-band precoding matrix. In this design, an index of the precoding matrix corresponding to each sub-band is no longer directly indicated, but the indication rule is used, thereby reducing indication overheads. Therefore, this process may be referred to as a process of performing compression indication on a precoding matrix corresponding to a corresponding sub-band in the UE 1, or the like. A process of indicating a precoding matrix corresponding to each sub-band of the UE 2 is similar to the foregoing process. An input of the precoding matrix calculation model is an uplink channel H, and an output is a precoding matrix of a sub-band corresponding to the uplink channel H. A name of the precoding matrix calculation model is not limited.

In this disclosure, the base station configures a personalized codebook for the UE, and further supports a sub-band-level precoding indication, thereby improving matching between a codebook and a channel and precoding precision.

Figure 13:
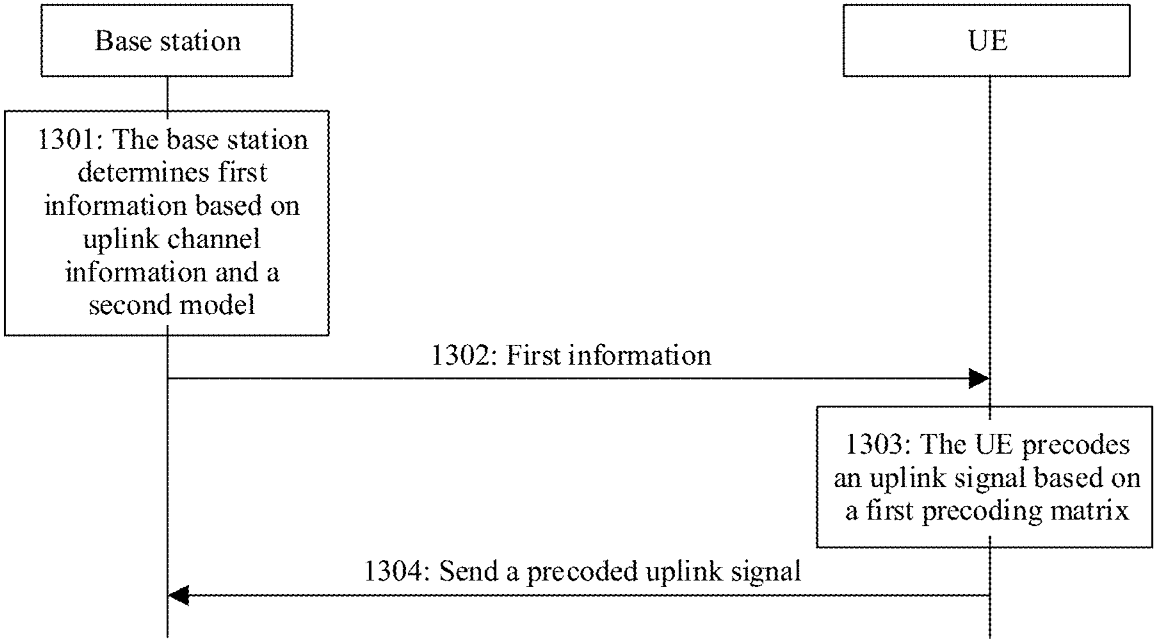

This disclosure further provides an uplink precoding method. In the method, a base station sends first information to UE, and the UE independently determines a precoding matrix based on the first information and a first model. As shown in FIG. 13, the method includes at least the following steps.

Step 1301: A base station determines first information based on uplink channel information and a second model.

An input of the second model is determined based on the uplink channel information, and the first information is determined based on an output of the second model. The second model may be trained offline or online by the base station, or may be obtained from a third-party node. For example, the third-party node is OAM, a cloud server, or a core network device. The base station determines the uplink channel information by measuring an uplink channel. The uplink channel information is used as the input of the second model, or the uplink channel information is processed. For example, the uplink channel information is quantized, a real part of the uplink channel information is separated from an imaginary part of the uplink channel information, a phase of the uplink channel information is separated from an amplitude of the uplink channel information, or the like. Processed uplink channel information is used as the input of the second model. The output of the second model is the first information; or the output of the second model is processed, to obtain the first information, or the like.

Step 1302: The base station sends the first information to the UE; and correspondingly, the UE receives the first information from the base station.

Step 1303: The UE precodes an uplink signal based on a first precoding matrix.

Alternatively, step 1303 may be described as follows: The UE determines a first precoding matrix based on the first information and a first model; and the UE precodes an uplink signal based on the first precoding matrix. The first model is trained offline or online by the UE, or is from a third-party node, for example, a base station, OAM, a cloud server, or a core network device. An input of the first model is determined based on the first information, and the first precoding matrix is determined based on an output of the first model. For example, when receiving the first information, the UE may use the first information as the input of the first model, and directly input the first information to the first model, or may process the received first information, and use processed first information as the input of the first model, or the like. The output of the first model may be the first precoding matrix. Alternatively, the output of the first model may be other information, for example, an uplink channel H. The output of the first model is processed, to obtain the first precoding matrix.

In this disclosure, a granularity of the first precoding matrix determined based on the output of the first model is not limited. For example, the granularity of the first precoding matrix is at a bandwidth level, a sub-band level, a resource block (RB) level, or a resource element (RE) level. For example, if the first precoding matrix is at the bandwidth level, an entire uplink bandwidth corresponds to one precoding matrix, namely, the first precoding matrix. The UE precodes an uplink signal in the uplink bandwidth by using the first precoding matrix. Alternatively, if the first precoding matrix is at the sub-band level, one sub-band corresponds to one precoding matrix. The UE precodes an uplink signal of a corresponding sub-band by using a precoding matrix corresponding to each sub-band, or the like. Alternatively, if the first precoding matrix is at the RB or RE level, each RB or RE corresponds to one precoding matrix. The UE precodes, by using a precoding matrix corresponding to each RB or RE, an uplink signal transmitted on the RB or RE, or the like. It may be understood that the foregoing is merely an example, and is not intended to limit this disclosure. For example, based on different designs or requirements, the first precoding matrix may alternatively be of another granularity.

Step 1304: The UE sends a precoded uplink signal to the base station; and correspondingly, the base station receives the precoded uplink signal from the UE.

In this disclosure, an example in which an uplink signal is uplink data information carried on a PUSCH is used. The UE precodes both the PUSCH and a demodulation reference signal (DMRS) corresponding to the PUSCH by using the first precoding matrix. The base station determines the first precoding matrix by estimating the received DRMS, decodes the PUSCH based on the first precoding matrix, and the like. Alternatively, the UE sends the first precoding matrix to the base station. The base station decodes, based on the received first precoding matrix, an uplink signal (for example, a signal carried in the PUSCH) from the UE, and the like.

In the uplink precoding method shown in FIG. 13, the UE independently determines the precoding matrix based on the first information and the first model. The precoding matrix is no longer selected offline from a codebook, but is a floating-point matrix generated by the UE based on the first information, so that the precoding matrix can better match a channel environment, and achieve better pointing precision.

Figure 14:
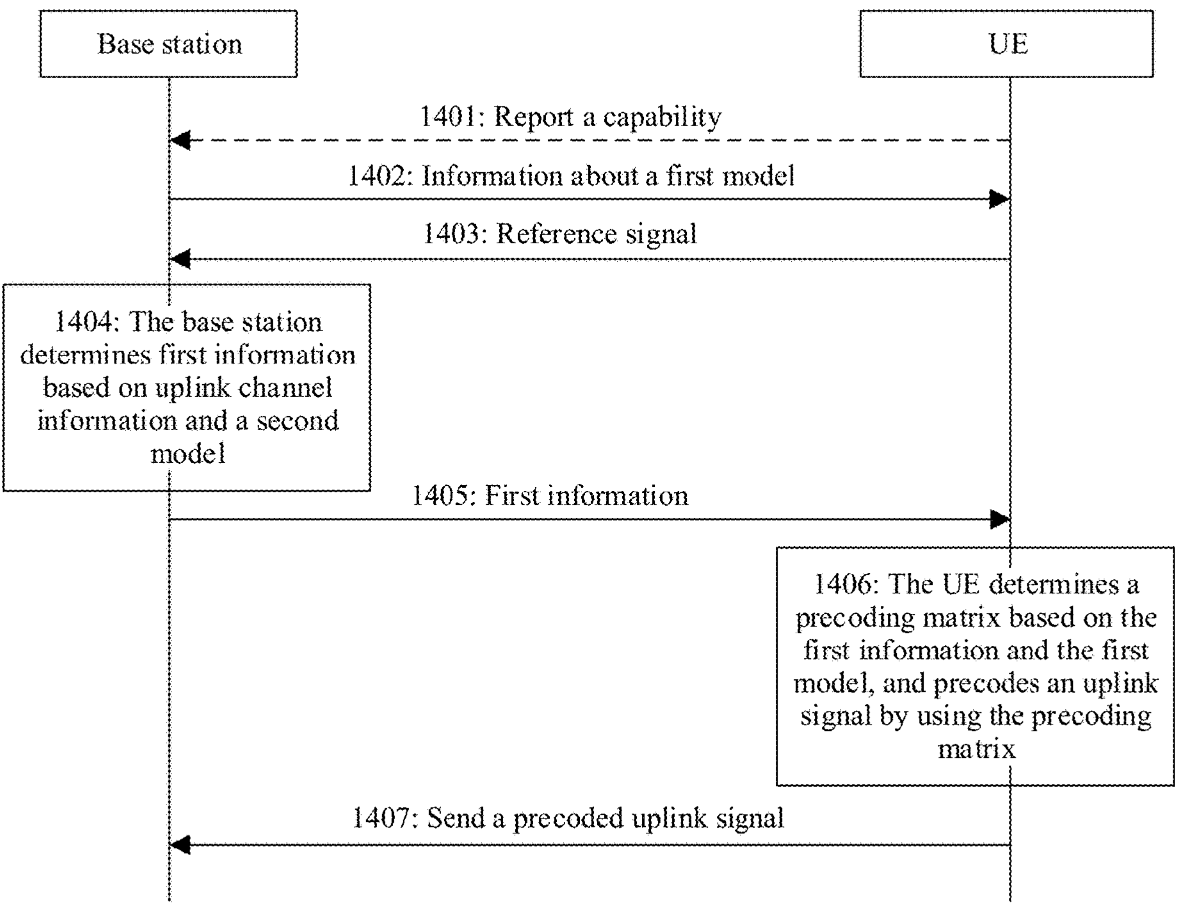

As shown in FIG. 14, a procedure of an uplink precoding method is provided. For example, a base station sends a first model to UE. In the procedure, at least the following steps are included.

Step 1401: UE reports a capability to a base station; and correspondingly, the base station receives the capability reported by the UE. Step 1401 is optional.

For example, when accessing a network, the UE may report the capability to the base station. The reported capability includes at least one of the following:

whether the UE supports running a machine learning model;

a type of the machine learning model supported by the UE, for example, a CNN, an RNN, or a random forest model;

a size of memory space that is in the UE and that is used to store the machine learning model;

computing power information of the UE, which may alternatively be referred to as a computing capability of a running model of the UE, including, for example, information like an operation speed of a processor of the UE and/or a volume of data that can be processed by the processor;

power consumption information of the UE, and the like, for example, running power consumption and a battery capacity of a chip; or hardware information of the UE, including configuration information of an antenna of the UE, for example, a quantity of antennas or a polarization direction, and/or a radio frequency channel.

Step 1402: The base station sends information about a first model to the UE; and correspondingly, the UE receives the information about the first model from the base station.

The base station sends the information about the first model to the UE only when the capability reported by the UE supports machine learning. In this design, the base station trains the first model and a second model offline or online.

In a design, the second model is a precoding compression model, and the first model is a precoding restoration model. In this disclosure, an example in which the base station performs model training is used for description. A method for performing model training by another node is similar. Optionally, a sample used by the another node to perform model training is from the base station, or is determined based on a given channel generation algorithm or a given channel generation model. This is not limited. Supervised learning is used as an example. Training data collected by the base station includes a training sample and a label. The training sample is an uplink channel H, and the label is a precoding matrix corresponding to the uplink channel H. The second model is a precoding compression model. The base station uses H as an input of the second model, and an output of the second model is a compressed precoding matrix. Alternatively, the base station determines, in an AI manner or a non-AI manner, a precoding matrix corresponding to the uplink channel H. The precoding matrix is used as the input of the second model, and the output is the compressed precoding matrix. The compressed precoding matrix is used as an input of the first model, and an output is a precoding matrix. The base station compares the precoding matrix output by the first model with the label, to determine a value of a loss function. Optionally, the loss function is a mean square error (MSE) function. If the value of the loss function is less than a threshold or meets a target requirement, the model training is stopped. Alternatively, if the value of the loss function is not less than a threshold or does not meet a target requirement, a parameter of the first model and/or a parameter of the second model are/is adjusted, and the model training continues. In this design, the second model is used to compress a precoding matrix. The second model may alternatively be referred to as a precoding compression model, or may have another name. The first model is used to determine or restore a precoding matrix based on received first information. The first model may alternatively be referred to as a precoding restoration model, or may have another name.

In another design, an example in which the second model is a CSI compression model and the first model is a precoding model is used to describe a model training process.

Figure 15:
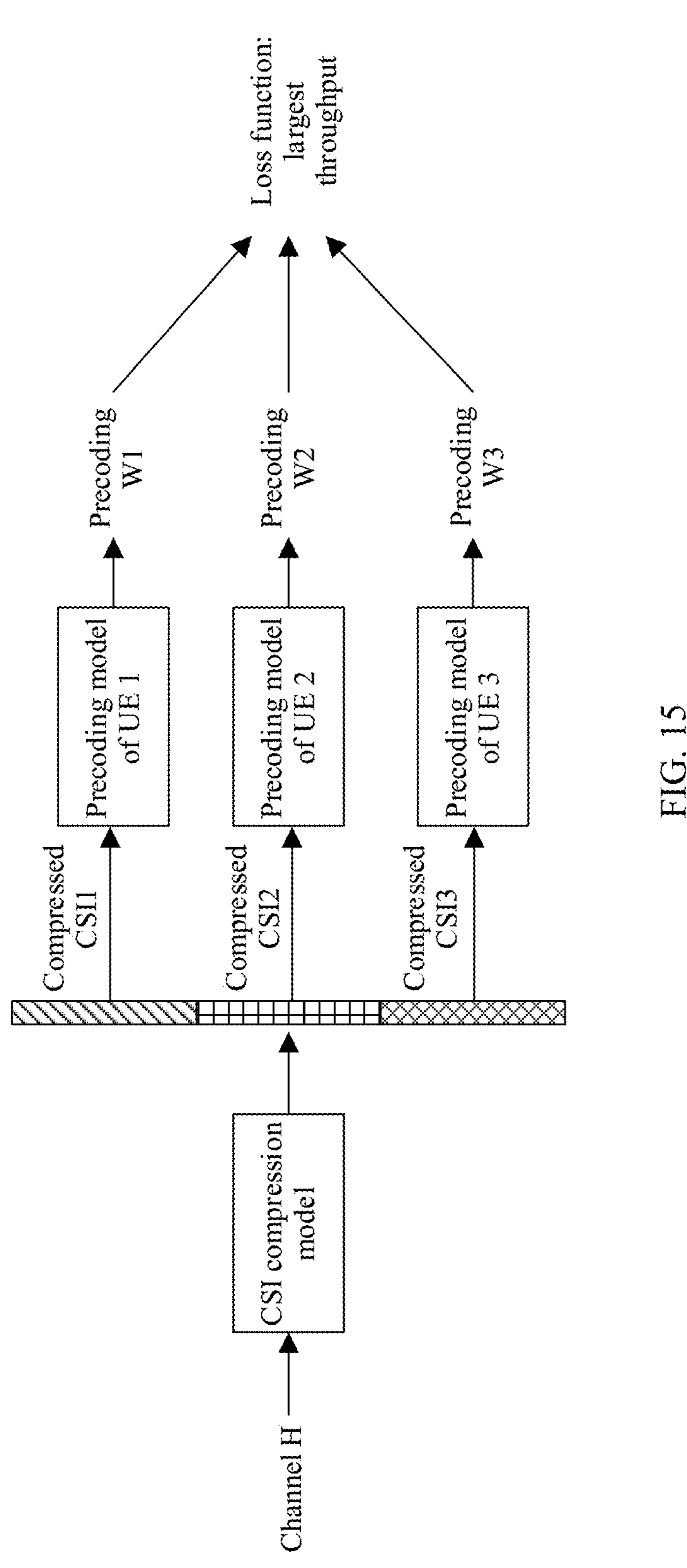
FIG. 15 is a diagram of training a CSI compression model and a precoding model according to this disclosure.

In a possible model training method, the CSI compression model and the precoding model are jointly trained. A training process thereof is shown in FIG. 15. An input of the CSI compression model is an uplink channel H, and an output of the CSI compression model is compressed CSI. Compressed CSI of each UE is input to a precoding model corresponding to the UE, where an output of the precoding model is a precoding matrix of the UE, or an output of the precoding model is uplink channel information. A precoding matrix is determined based on the uplink channel information. The precoding matrices of all the UEs are combined and substituted into a loss function. For the loss function, a parameter of the CSI model and a parameter of the precoding model of each UE are optimized. For example, a back propagation method, like a stochastic gradient descent method, may be used to obtain a parameter of an optimal model by using an iterative algorithm. In this method, a label is not required. Therefore, the method belongs to a non-supervised learning category. It should be noted that, in FIG. 15, joint training of the CSI compression model and precoding models of three UEs is used as an example, and is not intended to limit this disclosure.

Alternatively, the precoding model of each UE and the CSI compression model are separately trained. A training process includes: A base station collects training data, where the training data includes a training sample and a label, the training sample is an uplink channel H corresponding to the UE, and the label is a precoding matrix corresponding to the UE; the uplink channel H is used as an input of the CSI compression model, and an output is compressed CSI corresponding to the UE; the compressed CSI is input to the precoding model corresponding to the UE, and is output as a precoding matrix corresponding to the UE, or is output as uplink channel information, and a precoding matrix is determined based on the uplink channel information; a value of a loss function is calculated based on the precoding matrix output by the precoding model and the label; and when the value of the loss function is less than a threshold or meets a target requirement, the model training may end, or when the value of the loss function is not less than a threshold or does not meet a target requirement, a parameter of at least one model in the precoding model or the CSI compression model is updated or optimized, and the model training continues.

In this design, the CSI compression model is responsible for compressing the uplink channel H, outputting corresponding compressed CSI for each UE, and sending the compressed CSI to the UE. The UE processes the received compressed CSI, to generate a precoding matrix. Because there is correlation between sub-bands and even subcarriers of H, the CSI compression model on a base station side can compress H. In addition, because precoding mainly plays a role of matching a channel and avoiding interference, the CSI compression model can extract a main characteristic of the channel and a main characteristic of the interference, and reflect these characteristics in the compressed CSI. The UE may design a precoding matrix based on the main characteristics included in the compressed CSI, to achieve ideal precoding effect.

In this disclosure, after training the first model and the second model, the base station may send information about the first model to the UE. The information about the first model includes at least one of the following: a parameter of the model, an input format of the model, an output format of the model, or the like. A neural network is used as an example. A parameter of the model includes at least one of the following: a quantity of layers of the neural network, a width of the neural network, a connection relationship between layers, a weight of a neuron, an activation function of the neuron, an offset in the activation function, or the like. The UE restores or determines the first model based on the information about the first model.

Step 1403: The UE sends a reference signal to the base station; and correspondingly, the base station receives the reference signal from the UE.

The base station performs estimation, measurement, or the like on the received reference signal, to determine uplink channel information.

Step 1404: The base station determines the first information based on the uplink channel information and the second model.

Step 1405: The base station sends the first information to the UE; and correspondingly, the UE receives the first information from the base station.

Step 1406: The UE determines a precoding matrix based on the first information and the first model, and precodes an uplink signal by using the precoding matrix.

Step 1407: The UE sends a precoded uplink signal to the base station; and correspondingly, the base station receives the precoded uplink signal from the UE.

In a design, the second model is a precoding compression model, and the first model is a precoding restoration model. The base station uses the uplink channel information determined based on the reference signal sent by the terminal as the input of the second model, or uses information obtained after the uplink channel information is processed as the input of the second model. The output of the second model is a compressed precoding matrix, or information obtained after the output of the second model is processed is a compressed precoding matrix. Alternatively, the base station may determine, in an AI or non-AI manner, a precoding matrix corresponding to the uplink channel information, and use the precoding matrix as the input of the second model, or use a processed precoding matrix as the input of the second model. The output of the second model is a compressed precoding matrix. The first information may indicate the compressed precoding matrix, and the first information may explicitly or implicitly indicate the compressed precoding matrix. Subsequently, when receiving the first information, the UE may determine the compressed precoding matrix based on the first information. The compressed precoding matrix is used as the input of the first model, or information obtained after the compressed precoding matrix is processed is used as the input of the first model. The output of the first model includes the precoding matrix, or information obtained after information output by the first model is processed includes the precoding matrix, or the like.

In another design, the second model is a CSI compression model, and the first model is a precoding model. The base station uses the uplink channel information as the input of the second model, and the output of the second model is compressed CSI. The first information indicates the compressed CSI. The first information may explicitly or implicitly indicate the compressed CSI. When receiving the first information, the terminal may use the compressed CSI as the input of the first model, or use information obtained after the compressed CSI is processed as the input of the first model. The output of the first model includes uplink channel information. The terminal determines a precoding matrix based on the uplink channel information. Specifically, the terminal may convert the uplink channel information into the precoding matrix or the like in an AI manner or a non-AI manner. The non-AI manner includes but is not limited to a WMMSE method, a zero forcing ZF method, another method, or the like. Alternatively, the output of the first model directly includes the precoding matrix or the like.

It should be noted that, in the foregoing descriptions, determining a precoding matrix of a single UE is used as an example for description. On a base station side, if the base station serves a plurality of UEs, and the plurality of UEs occupy same resources, first information of the plurality of UEs may be simultaneously determined based on the foregoing second model. For example, the second model is a CSI compression model, and the first model is a precoding model.

Figure 16:
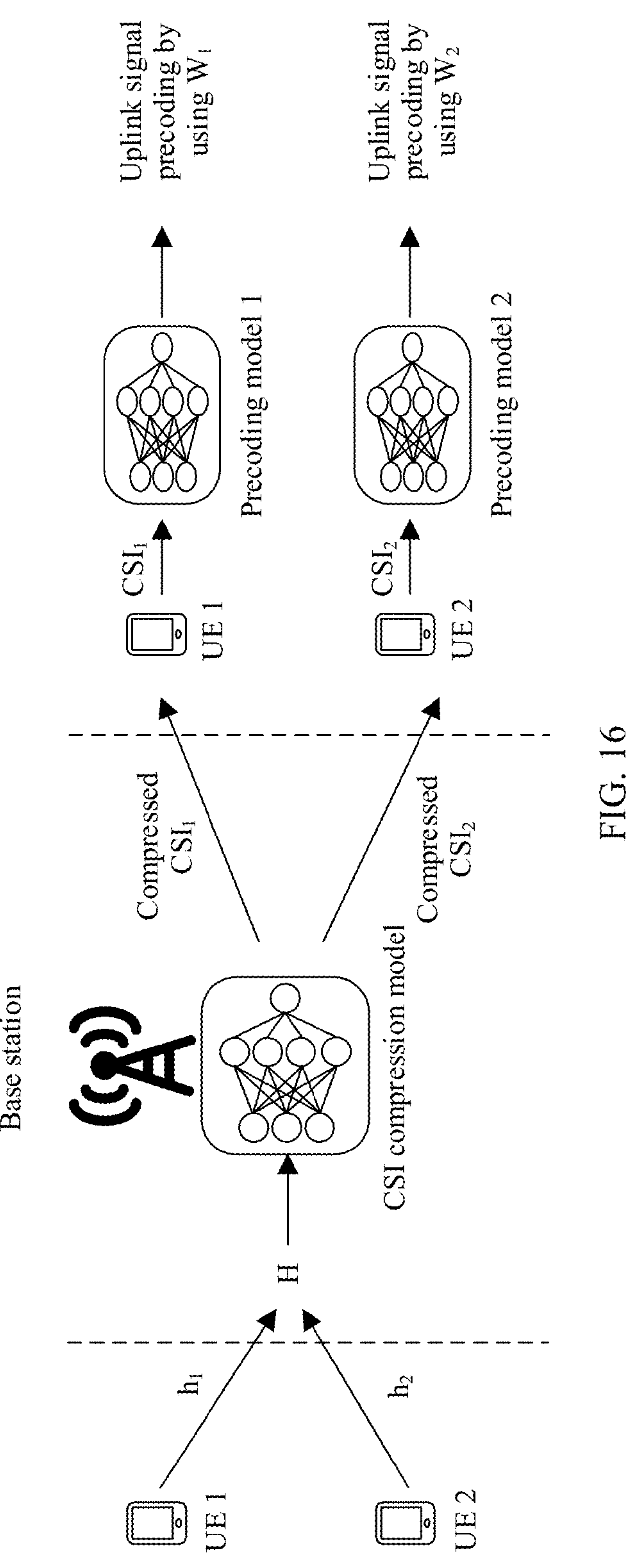
FIG. 16 is a diagram of applying a CSI compression model and a precoding model according to this disclosure.

As shown in FIG. 16, it is set that the base station serves two UEs, and the two UEs occupy same resources. In this case, the base station separately measures uplink channel information corresponding to the two UEs. The two UEs are respectively referred to as h1 and h2. The base station determines cascaded H of channels based on h1 and h2, where H={h1, h2}. The cascaded H is used as an input of the CSI compression model, and an output is cascaded compressed CSI, where the cascaded compressed CSI may be represented as $G=[G_1, G_2, \ldots, G_U]$, where a value of U is consistent with a quantity of UEs. In a scenario in which the two UEs occupy the same resource, the value of U is 2, that is, in this scenario, the output of the CSI compression model is $G=[G_1, G_2]$, where $G_1$ represents compressed CSI corresponding to UE 1, and $G_2$ represents compressed CSI corresponding to UE 2. In this disclosure, the compressed CSI may be represented as the following:

$$G_i = [g_1, g_2, \ldots, g_L]$$

Herein, i represents a number of the UE. A value range of i is a positive integer less than or equal to U, and a value range of U is a positive integer greater than or equal to 1. L indicates a length of the CSI fed back over an air interface. Further, a length of $G_i$ output by the CSI compression model may be intercepted, to reduce air interface overheads for feeding back the compressed CSI.

In this disclosure, as shown in FIG. 16, it is set that the compressed CSI of the UE 1 is referred to as compressed CSI1, and the compressed CSI1 is the foregoing $G_1$. The compressed CSI1 is used as an input of a precoding model 1 corresponding to the UE 1, and an output is a precoding matrix W1. The UE 1 precodes an uplink signal of the UE 1 by using W1. It is set that the compressed CSI corresponding to the UE 2 may be referred to as compressed CSI2. The compressed CSI2 is used as an input of a precoding model 2 corresponding to the UE 2, and an output is a precoding matrix W2. The UE 2 precodes an uplink signal of the UE 2 by using W2.

Alternatively, in this disclosure, the base station may separately compress an uplink channel H of each UE. For example, the base station determines a characteristic matrix H of the uplink channel corresponding to each UE, where His used as an input of a CSI compression model, and an output of the CSI compression model is compressed CSI corresponding to the UE. For example, the base station may use the uplink channel information h1 corresponding to the UE 1 as the input of the CSI compression model, and the output is the compressed CSI corresponding to the UE 1, namely, the compressed CSI1. Alternatively, the base station uses the uplink channel information h2 corresponding to the UE 2 as the input of the CSI compression model, and the output is the compressed CSI corresponding to the UE 2, namely, the compressed CSI2.

Figure 17:
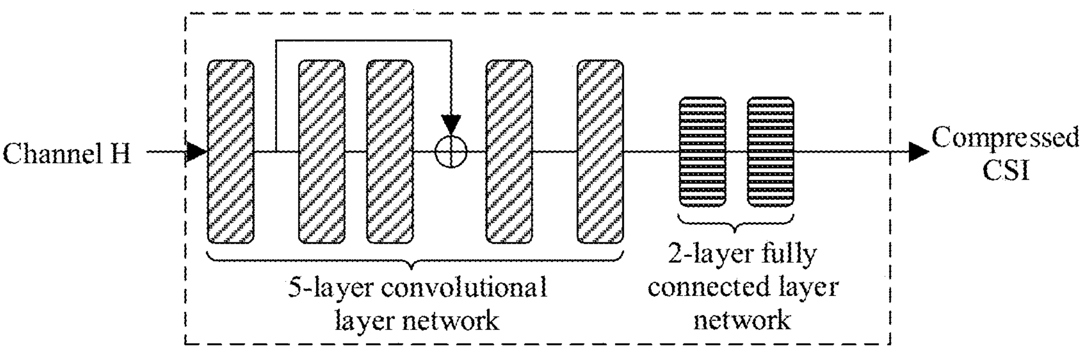
FIG. 17 is a diagram of structures of a CSI compression model and a precoding model according to this disclosure.
Figure 17:
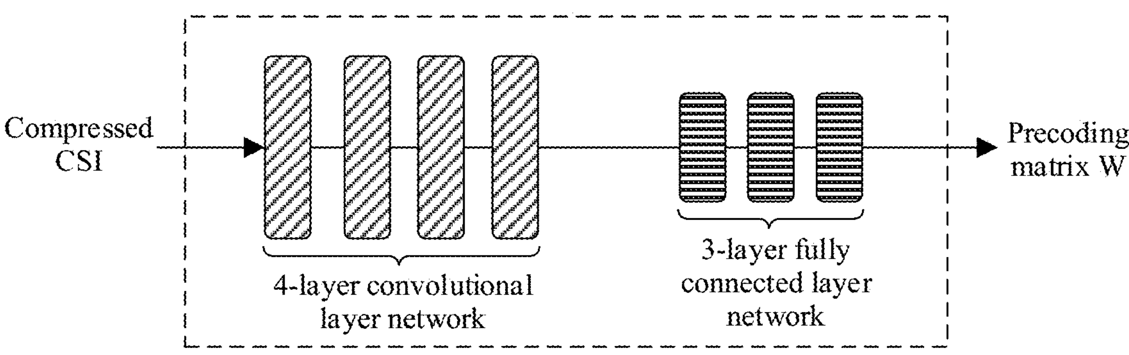

In a design, as shown in FIG. 17, a CSI compression model may include a 5-layer convolutional layer network and a 2-layer fully connected layer network, and a precoding model may include a 4-layer convolutional layer network, a 3-layer fully connected layer network, and the like.

It should be noted that, in this disclosure, a meaning of H is described as follows: H may be referred to as uplink channel information, a characteristic matrix of an uplink channel, a response of an uplink channel, or the like. In this disclosure, H may refer to uplink channel information of a single UE, or indicate uplink channel information of a plurality of UEs. For example, a system includes three UEs, and the three UEs occupy same resources. In this case, the base station may measure reference signals respectively sent by the three UEs on the corresponding resources, and determine uplink channel information hi corresponding to each UE, where H may refer to cascaded uplink channel information H=[h1, h2, h3] of the three UEs.

In this disclosure, a codebook is no longer used, but a second model on a base station side and a first model on a UE side are designed. For example, the second model is a compressed CSI model. In the compressed CSI model, CSI may be compressed into a bit string with a small length. The base station may control air interface overheads by controlling a length of the CSI, and small air interface overheads may be achieved through design. On the UE side, a precoding matrix is generated by using a precoding model and the compressed CSI. In this design, the precoding matrix obtained by the UE is not selected from a discrete codebook, so that the precoding matrix can better match a channel environment and has better pointing precision. In addition, the second model is designed, so that an output of the second model supports precoding matrices of various granularities, for example, a precoding matrix at a bandwidth level, a precoding matrix at a sub-band level, or a precoding matrix at an RE level.

In addition, both FIG. 8 and FIG. 10 show solutions based on an explicit codebook. Compared with feeding back an original precoding floating-point matrix W, feeding back a codeword of a precoding matrix in a codebook can significantly reduce feedback overheads. However, codewords in the codebook are discrete. Therefore, there is a difference from an optimal precoding matrix W. Although a difference may be reduced by increasing a quantity of codewords in the codebook, a larger codebook accordingly increases a quantity of bits of an index, and increases feedback overheads. In the solution in FIG. 13 or FIG. 14, a precoding low-overhead indication is completed by using two matching AI models that are respectively on the base station side and the UE side.

It may be understood that, to implement functions in the foregoing methods, the base station and the terminal include corresponding hardware structures and/or software modules for performing the functions. A person skilled in the art should be easily aware that, with reference with units and method steps in the examples described in this disclosure, this disclosure can be implemented by hardware or a combination of hardware and computer software. Whether a function is performed by hardware or hardware driven by computer software depends on a particular application scenario and a design constraint that are of a technical solution.

Figure 18:
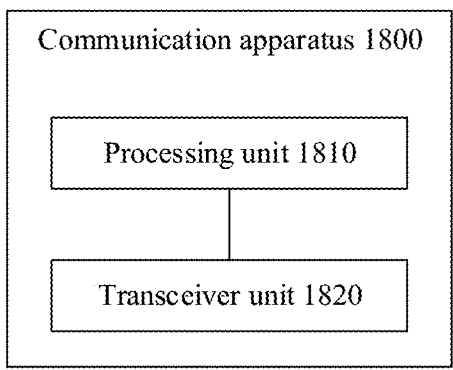
FIG. 18 and FIG. 19 each are a diagram of a structure of an apparatus according to this disclosure.
Figure 19:
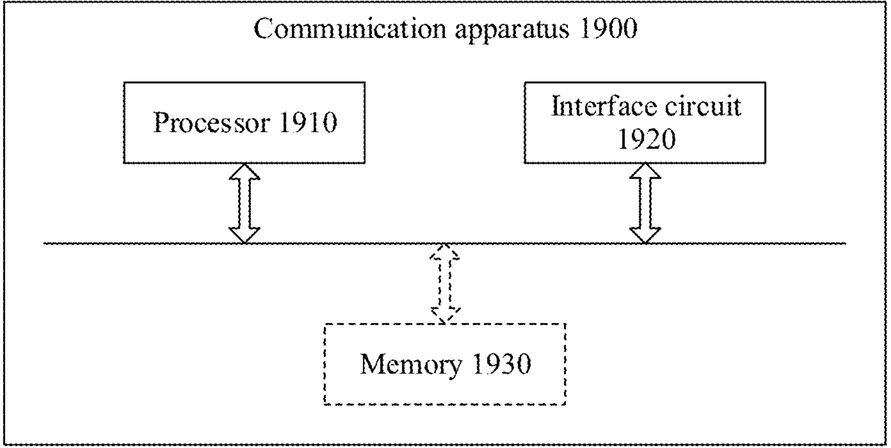

FIG. 18 and FIG. 19 each are a diagram of a possible structure of a communication apparatus according to this disclosure. These communication apparatuses may be configured to implement functions of the terminal or the base station in the foregoing methods, and therefore can also implement beneficial effect of the foregoing methods. In this disclosure, the communication apparatus may be one of the terminals 120*a* to 120*j* shown in FIG. 1, or may be the base station 119*a* or 119*b* shown in FIG. 1, or may be a module (for example, a chip) used in a terminal or a base station.

As shown in FIG. 18, a communication apparatus 1800 includes a processing unit 1810 and a transceiver unit 1820. The transceiver unit may alternatively be referred to as a communication unit. The communication apparatus 1800 is configured to implement function of the terminal or the base station in the method shown in FIG. 8, FIG. 10, or FIG. 13.

When the communication apparatus 1800 is configured to implement the function of the base station in the method shown in FIG. 8 or FIG. 10, the transceiver unit 1820 is configured to receive a first reference signal from a terminal device; the processing unit 1810 is configured to determine a first codebook based on the received first reference signal, where the first codebook is used to precode an uplink signal; and the transceiver unit 1820 is further configured to send the first codebook to the terminal device.

When the communication apparatus 1800 is configured to implement the function of the UE in the method shown in FIG. 8 or FIG. 10, the transceiver unit 1820 is configured to: send a first reference signal to an access network device, and receive a first codebook from the access network device; and the processing unit 1810 is configured to precode an uplink signal by using the first codebook.

When the communication apparatus 1800 is configured to implement the function of the UE in the method shown in FIG. 13, the transceiver unit 1820 is configured to receive first information from an access network device; the processing unit 1810 is configured to precode an uplink signal based on a first precoding matrix, where the first precoding matrix is determined based on an output of a first model, and an input of the first model is determined based on the first information; and the transceiver unit 1820 is further configured to send a precoded uplink signal to the access network device.

When the communication apparatus 1800 is configured to implement the function of the base station in the method shown in FIG. 13, the processing unit 1810 is configured to determine first information based on uplink channel information and a second model, where an input of the second model is determined based on the uplink channel information, and the first information is determined based on an output of the second model; and the transceiver unit 1820 is configured to send the first information to a terminal device, where the first information indicates a compressed first precoding matrix, or the first information indicates compressed channel state information CSI.

For more detailed descriptions of the processing unit 1810 and the transceiver unit 1820, directly refer to related descriptions of the method shown in FIG. 8, FIG. 10, or FIG. 13. Details are not described herein.

As shown in FIG. 19, a communication apparatus 1900 includes a processor 1910 and an interface circuit 1920. The processor 1910 and the interface circuit 1920 are coupled to each other. It may be understood that the interface circuit 1920 may be a transceiver or an input/output interface. Optionally, the communication apparatus 1900 may further include a memory 1930, configured to: store instructions executed by the processor 1910, or store input data required by the processor 1910 to run the instructions, or store data generated after the processor 1910 runs the instructions.

When the communication apparatus 1900 is configured to implement the foregoing method, the processor 1910 is configured to implement a function of the processing unit 1810, and the interface circuit 1920 is configured to implement a function of the transceiver unit 1820.

When the communication apparatus is a chip used in a terminal, the chip in the terminal implements a function of the terminal in the foregoing method. The chip in the terminal receives information from another module (for example, a radio frequency module or an antenna) in the terminal, where the information is sent by a base station to the terminal; or the chip in the terminal sends information to another module (for example, a radio frequency module or an antenna) in the terminal, where the information is sent by the terminal to a base station.

When the communication apparatus is a module used in a base station, the module in the base station implements a function of the base station in the foregoing method. The module in the base station receives information from another module (for example, a radio frequency module or an antenna) in the base station, where the information is sent by a terminal to the base station; or the module in the base station sends information to another module (for example, a radio frequency module or an antenna) in the base station, where the information is sent by the base station to a terminal. The module in the base station herein may be a baseband chip in the base station, or may be a DU or another module. The DU herein may be a DU in an open radio access network (O-RAN) architecture.

It may be understood that the processor in this disclosure may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor or may be any regular processor.

The memory in this disclosure may be a random access memory, a flash memory, a read-only memory, a programmable read-only memory, an erasable programmable read-only memory, an electrically erasable programmable read-only memory, a register, a hard disk, a removable hard disk, a CD-ROM, or a storage medium of any other form well-known in the art.

For example, a storage medium is coupled to the processor, so that the processor can read information from the storage medium and write information into the storage medium. The storage medium may alternatively be a component of the processor. The processor and the storage medium may be located in an ASIC. In addition, the ASIC may be located in a base station or a terminal. Certainly, the processor and the storage medium may exist in the base station or the terminal as discrete components.

All or some of the methods in this disclosure may be implemented by software, hardware, firmware, or any combination thereof. When software is used to implement the methods, all or some of the methods may be implemented in a form of a computer program product. The computer program product includes one or more computer programs or instructions. When the computer programs or instructions are loaded and executed on a computer, all or some of the procedures or functions according to this disclosure are executed. The computer may be a general-purpose computer, a dedicated computer, a computer network, a network device, user equipment, a core network device, OAM, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired or wireless manner. The computer-readable storage medium may be any usable medium that can be accessed by the computer, or a data storage device, for example, a server or a data center, integrating one or more usable media. The usable medium may be a magnetic medium, for example, a floppy disk, a hard disk, or a magnetic tape; or may be an optical medium, for example, a digital video disc; or may be a semiconductor medium, for example, a solid-state disk. The computer-readable storage medium may be a volatile or non-volatile storage medium, or may include two types of storage media: a volatile storage medium and a non-volatile storage medium.

In this disclosure, unless otherwise stated or there is a logic conflict, terms and/or descriptions in different embodiments are consistent and may be mutually referenced, and technical features in different embodiments may be combined based on an internal logical relationship thereof, to form a new embodiment.

In this disclosure, "at least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. In the text descriptions of this disclosure, the character "/" indicates an "or" relationship between the associated objects. In a formula in this disclosure, the character "/" indicates a "division" relationship between the associated objects. "Including at least one of A, B, or C" may indicate: including A; including B; including C; including A and B; including A and C; including B and C; and including A, B, and C.

It may be understood that various numbers in this disclosure are merely used for differentiation for ease of description, and are not used to limit the scope of this disclosure. The sequence numbers of the foregoing processes do not mean execution sequences, and the execution sequences of the processes should be determined based on functions and internal logic of the processes.

What is claimed is:

1. An uplink precoding method, comprising:

receiving a first reference signal from a terminal device;

measuring the first reference signal on Z resources to obtain Z pieces of uplink channel information, wherein Z is an integer greater than or equal to 1;

determining Z precoding matrices based on the Z pieces of uplink channel information;

determining M precoding matrices based on the Z precoding matrices, wherein M is less than or equal to Z;

determining a first codebook that comprises the M precoding matrices, wherein the first codebook is used to precode an uplink signal; and sending the first codebook to the terminal device.

2. The method according to claim 1, wherein the determining the first codebook based on the Z pieces of uplink channel information comprises:

determining the first codebook based on the Z pieces of uplink channel information and a codebook generation model.

3. The method according to claim 1, wherein the determining the M precoding matrices comprises:

determining M precoding matrices based on the Z precoding matrices and a precoding matrix generation model, wherein M is less than or equal to Z.

4. The method according to claim 3, wherein the method further comprises:

separately quantizing the M precoding matrices to obtain M quantized precoding matrices, wherein the first codebook comprises the M quantized precoding matrices.

5. The method according to claim 1, wherein the method further comprises:

sending indication information to the terminal device, wherein the indication information indicates X precoding matrices corresponding to X sub-bands, the X precoding matrices belong to the first codebook, each of the X precoding matrices is used to precode an uplink signal on a corresponding sub-band, and X is a positive integer.

6. The method according to claim 5, wherein the sending indication information to the terminal device comprises:

sending the indication information to the terminal device according to an indication rule of a sub-band precoding matrix.

7. An apparatus, comprising:

at least one processor coupled to one or more memories storing programming instructions that are executable by the at least one processor to perform operations comprising:

receiving a first reference signal from a terminal device;

measuring the first reference signal on Z resources to obtain Z pieces of uplink channel information, wherein Z is an integer greater than or equal to 1;

determining Z precoding matrices based on the Z pieces of uplink channel information;

determining M precoding matrices based on the Z precoding matrices, wherein M is less than or equal to Z;

determining a first codebook that comprises the M precoding matrices, wherein the first codebook is used to precode an uplink signal; and sending the first codebook to the terminal device.

8. The apparatus according to claim 7, wherein the determining the first codebook based on the Z pieces of uplink channel information comprises:

determining the first codebook based on the Z pieces of uplink channel information and a codebook generation model.

9. The apparatus according to claim 7, wherein the determining the M precoding matrices comprises:

determining M precoding matrices based on the Z precoding matrices and a precoding matrix generation model, wherein M is less than or equal to Z.

10. The apparatus according to claim 9, wherein the operations further comprise:

separately quantizing the M precoding matrices to obtain M quantized precoding matrices, wherein the first codebook comprises the M quantized precoding matrices.

11. The apparatus according to claim 7, wherein the operations comprise:

sending indication information to the terminal device, wherein the indication information indicates X precoding matrices corresponding to X sub-bands, the X precoding matrices belong to the first codebook, each of the X precoding matrices is used to precode an uplink signal on a corresponding sub-band, and X is a positive integer.

12. An apparatus, comprising:

at least one processor coupled to one or more memories storing programming instructions that are executable by the at least one processor to perform operations comprising:

sending a first reference signal to an access network device;

receiving a first codebook from the access network device;

receiving an indication rule of a sub-band precoding matrix from the access network device, wherein the indication rule of the sub-band precoding matrix comprises an uplink channel bandwidth, where the uplink channel bandwidth comprises at least a first sub-band and a second sub-band; and precoding an uplink signal on the first sub-band by using the first codebook.

13. The apparatus according to claim 12, wherein the precoding an uplink signal by using the first codebook comprises:

receiving indication information from the access network device, wherein the indication information indicates X precoding matrices corresponding to X sub-bands, and the X precoding matrices belong to the first codebook; and precoding an uplink signal on a corresponding sub-band by using each of the X precoding matrices.

14. The apparatus according to claim 12, wherein:

an indication rule of a precoding matrix corresponding to the first sub-band comprises an indication of an index of the precoding matrix corresponding to the first sub-band; and an indication rule of a precoding matrix corresponding to the second sub-band comprises an indication of an offset direction and an offset value that are of an index of the precoding matrix of the second sub-band relative to the index of the precoding matrix of the first sub-band.

15. The apparatus according to claim 14, wherein the first codebook is a codebook of the first sub-band.

* * * * *